Aug. 21, 1962  W. JONES  3,049,846
TRAY-TYPE CARTONING MACHINE
Filed April 2, 1959  14 Sheets-Sheet 1
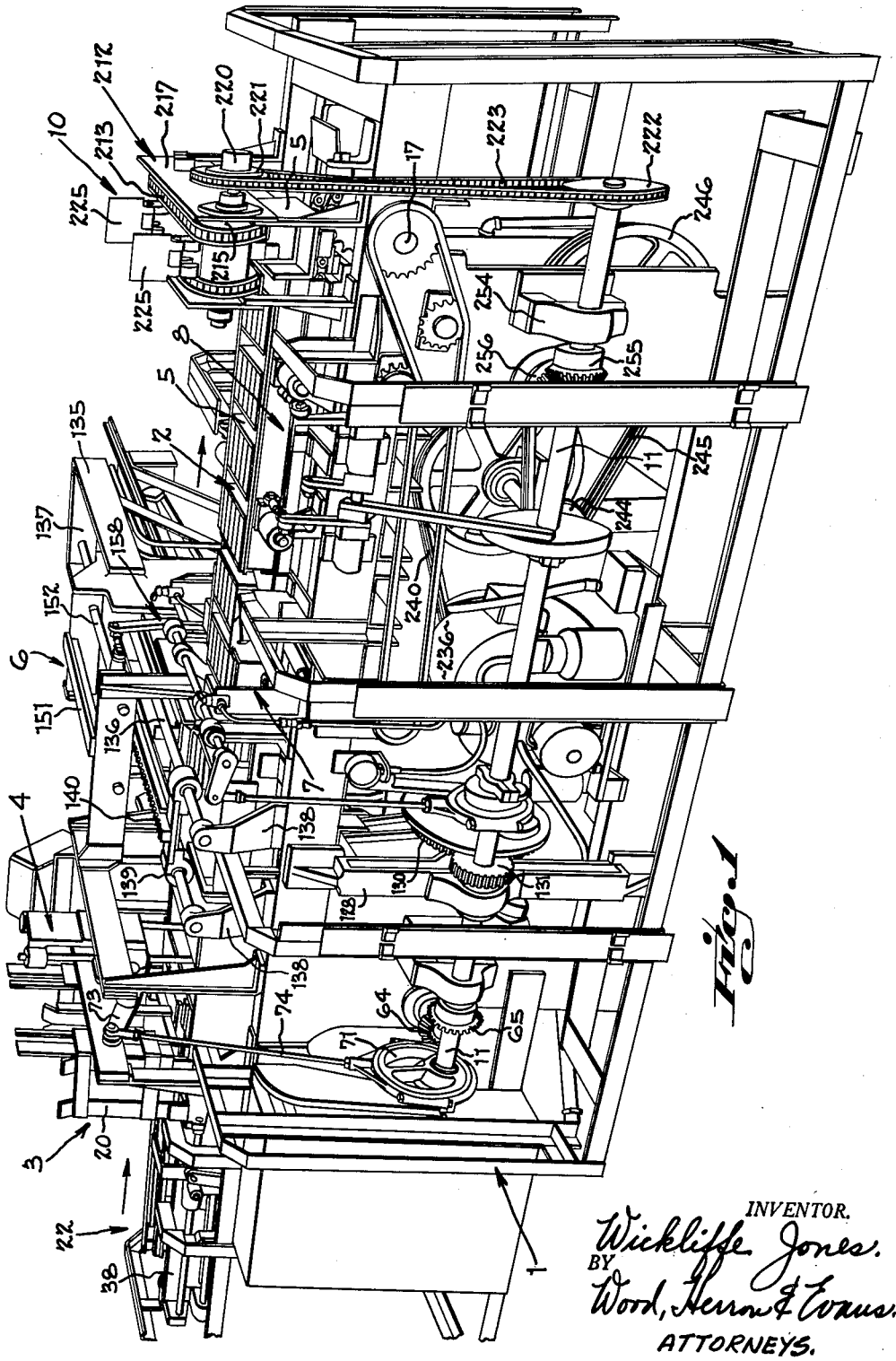
INVENTOR.
Wickliffe Jones.
BY
Wood, Herron & Evans.
ATTORNEYS.

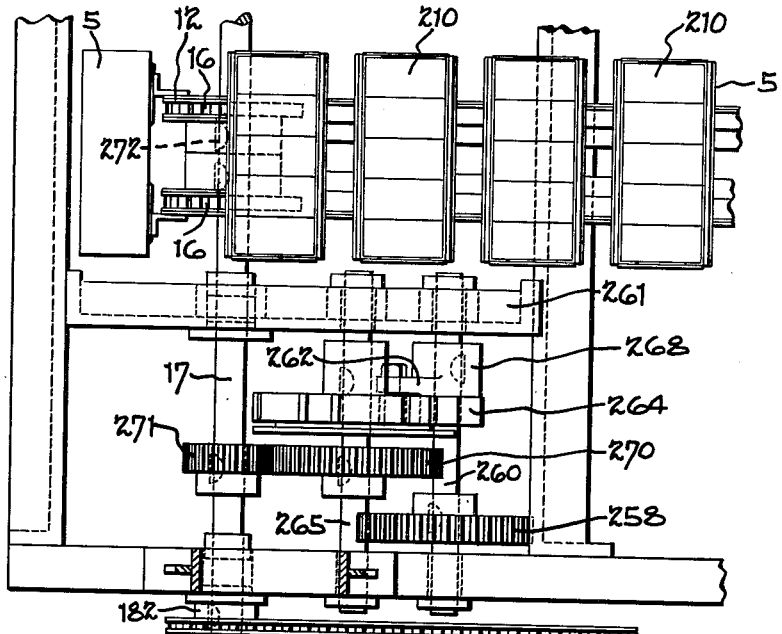
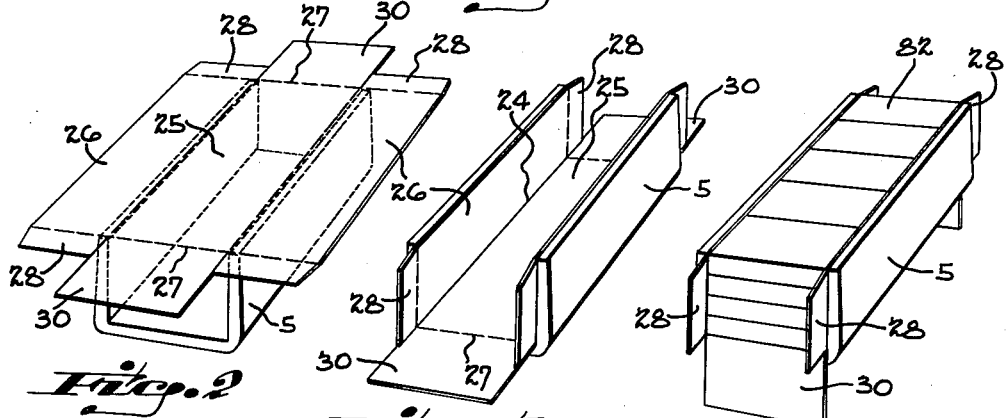
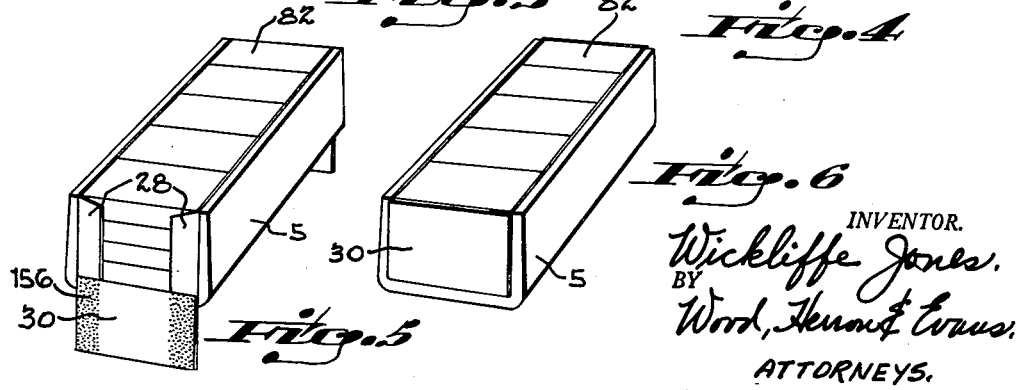

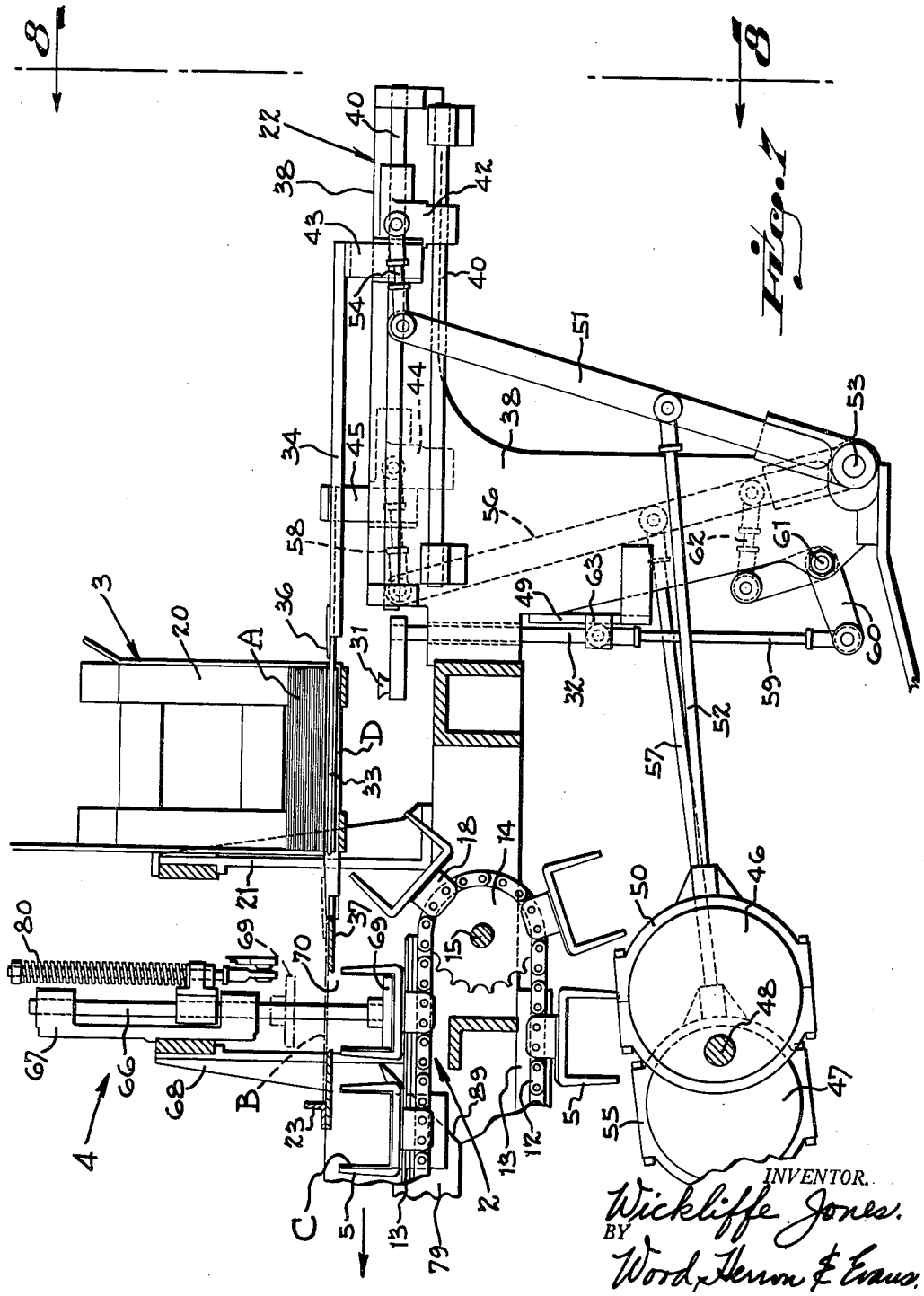

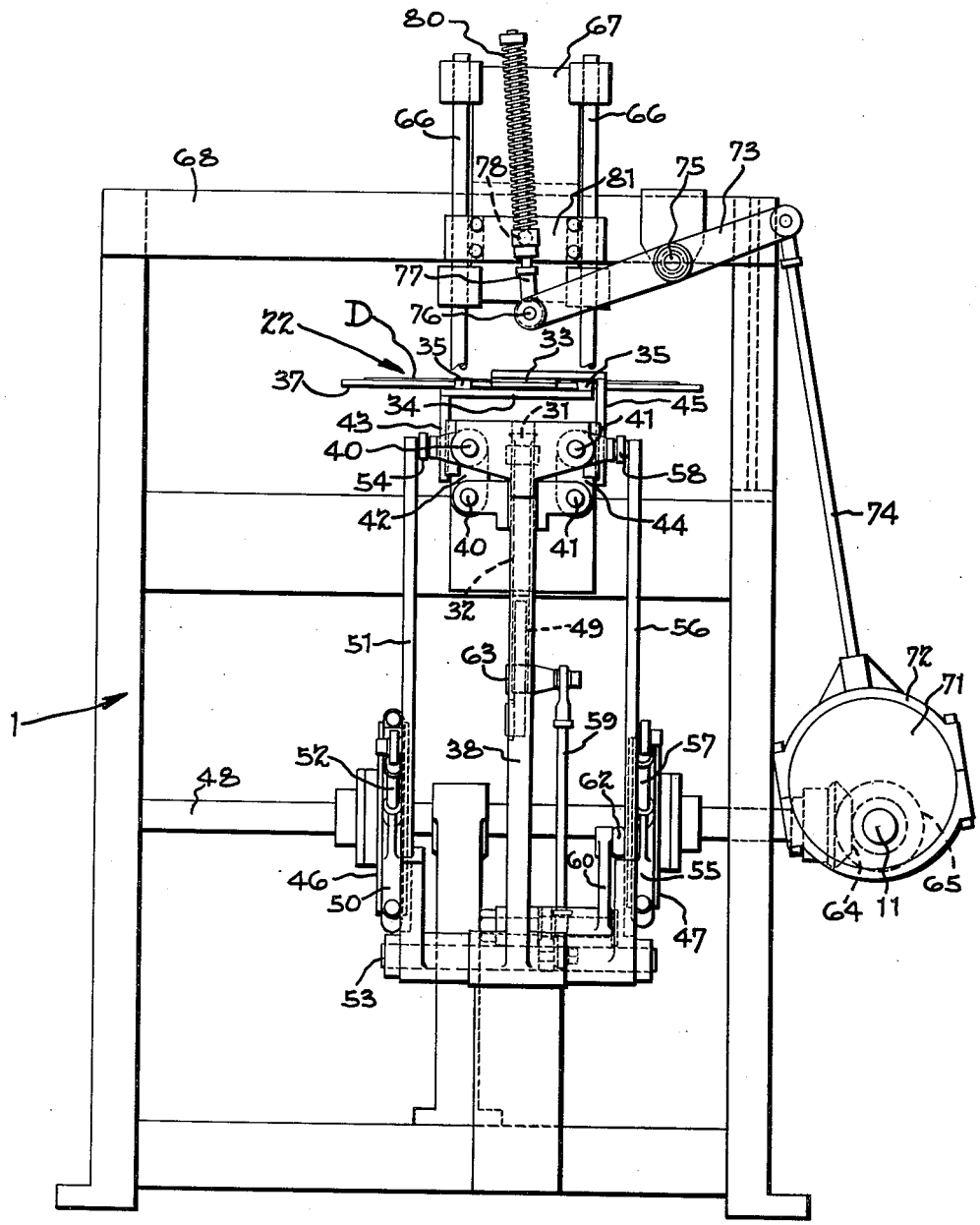

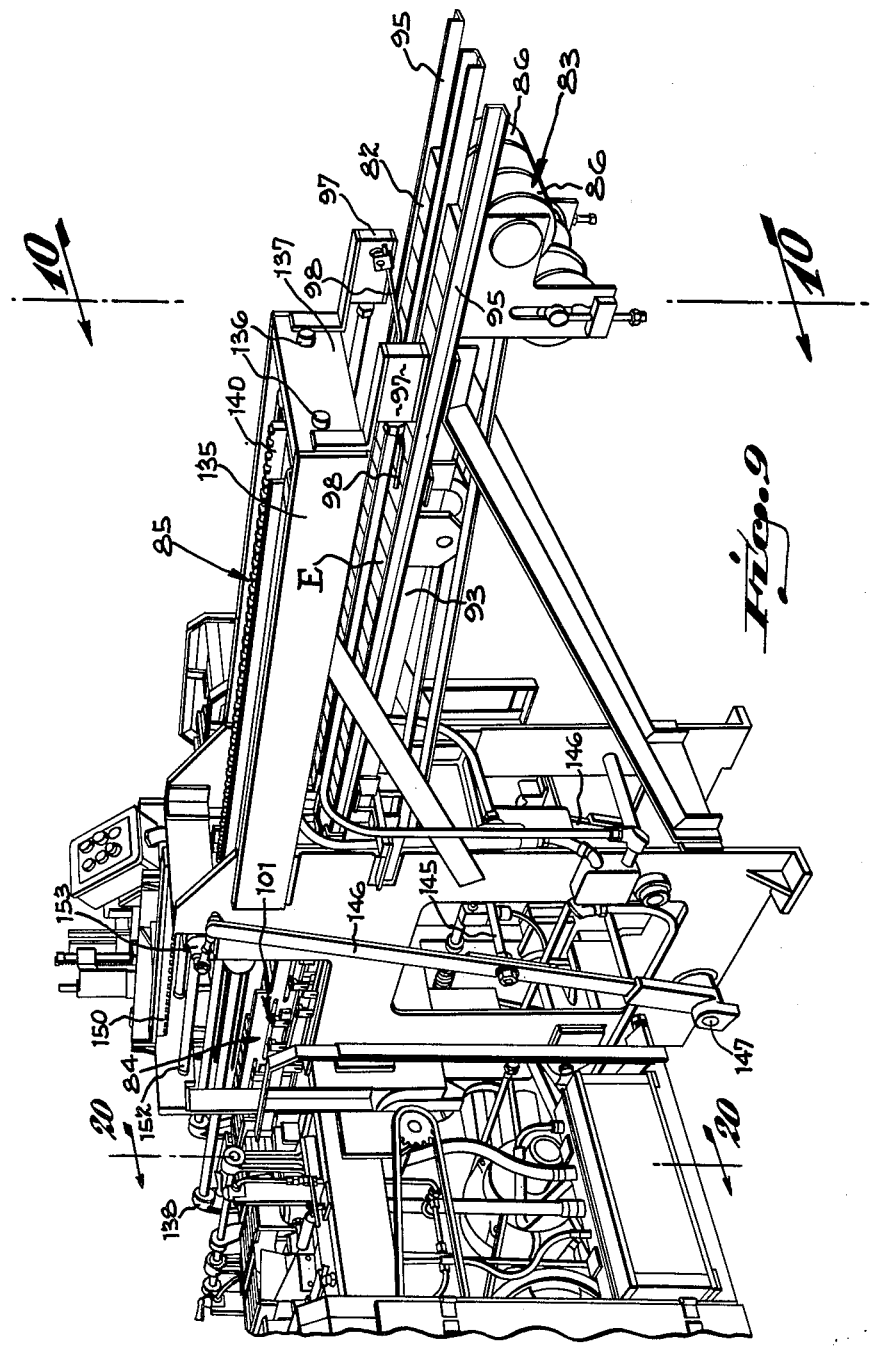

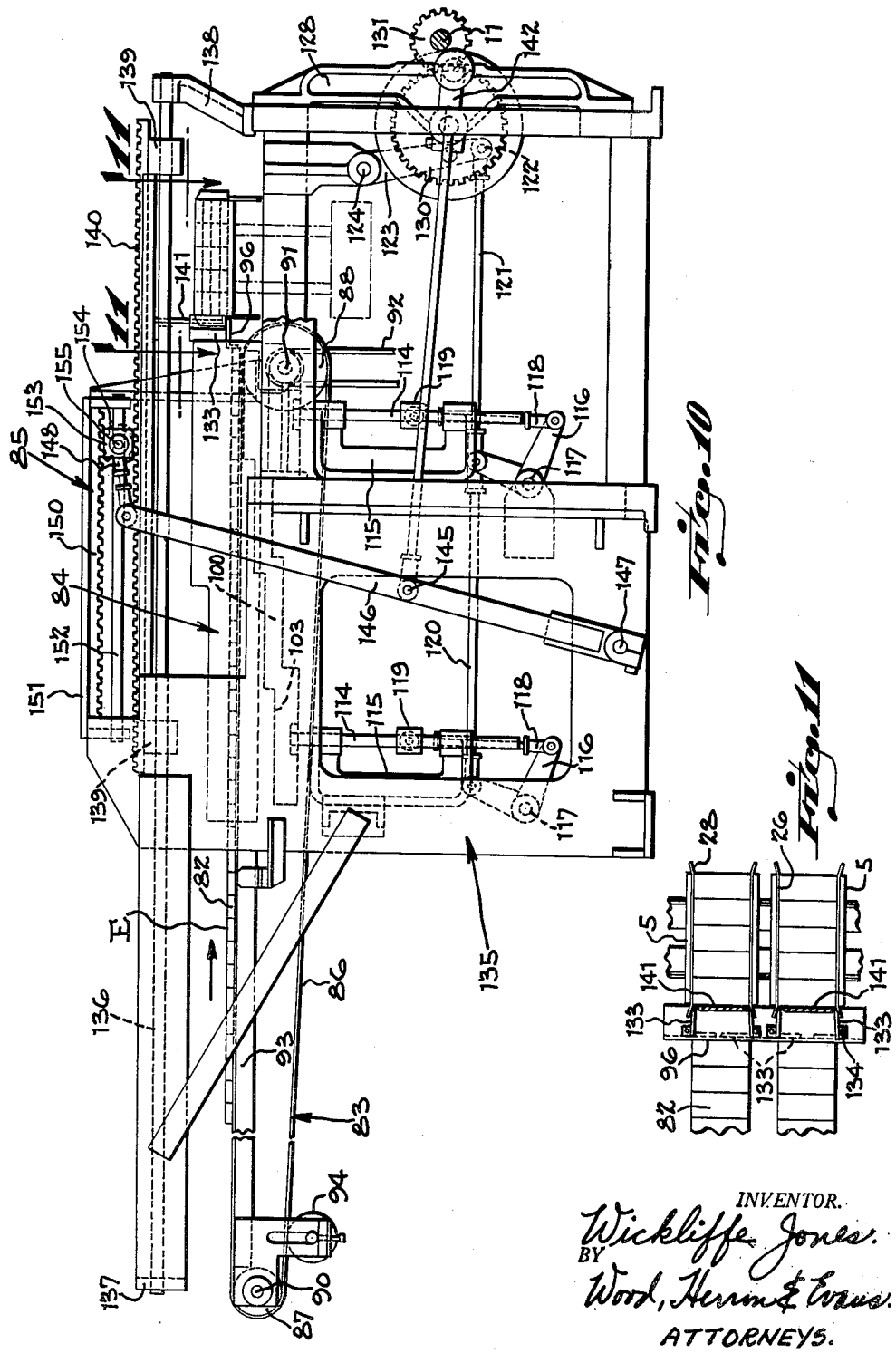

Aug. 21, 1962 W. JONES 3,049,846
TRAY-TYPE CARTONING MACHINE
Filed April 2, 1959 14 Sheets-Sheet 7
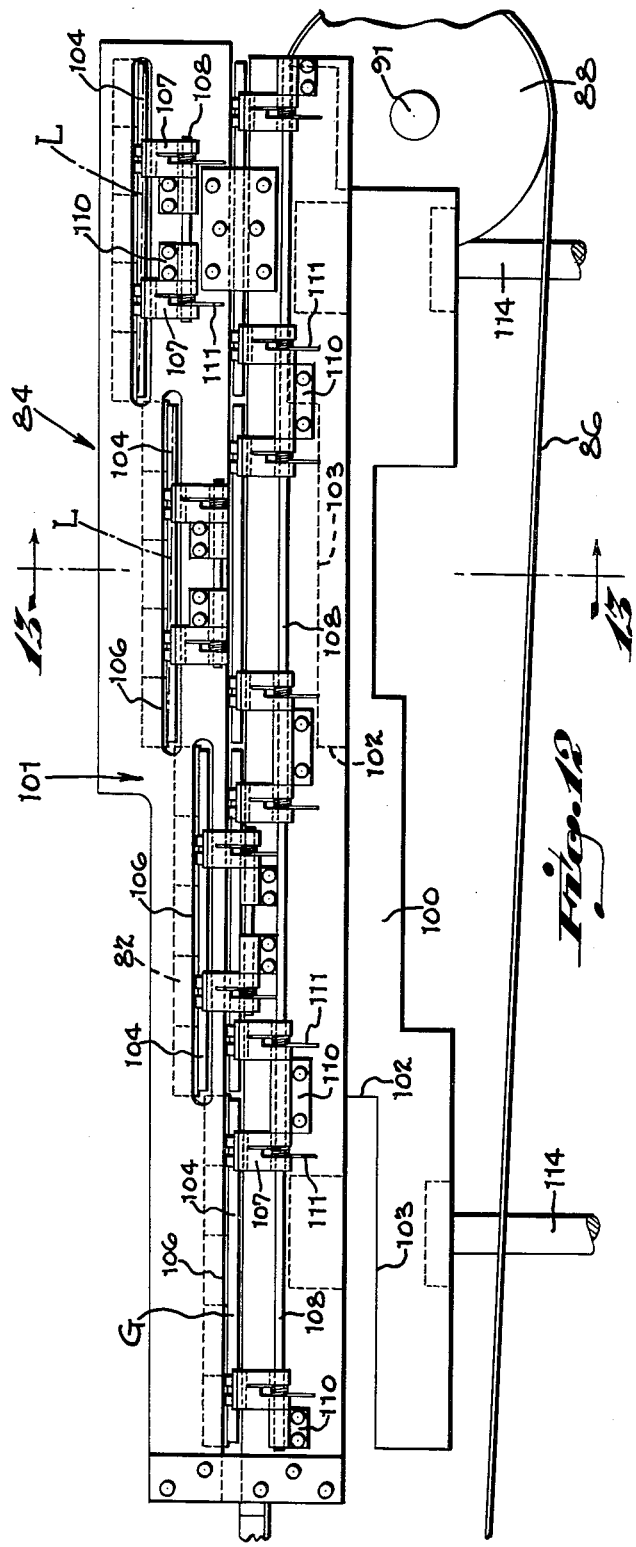
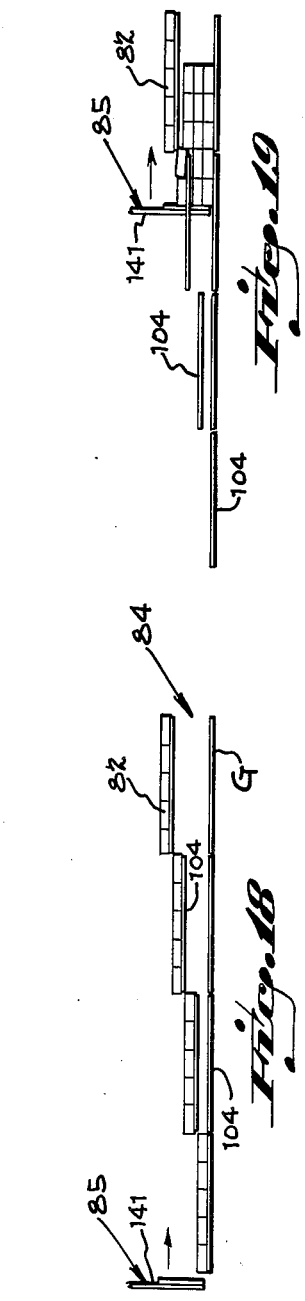
INVENTOR.
Wickliffe Jones.
BY
Wood, Herron & Evans.
ATTORNEYS.

Aug. 21, 1962 W. JONES 3,049,846
TRAY-TYPE CARTONING MACHINE
Filed April 2, 1959 14 Sheets-Sheet 8

INVENTOR.
Wickliffe Jones.
BY
Wood, Herron & Evans.
ATTORNEYS.

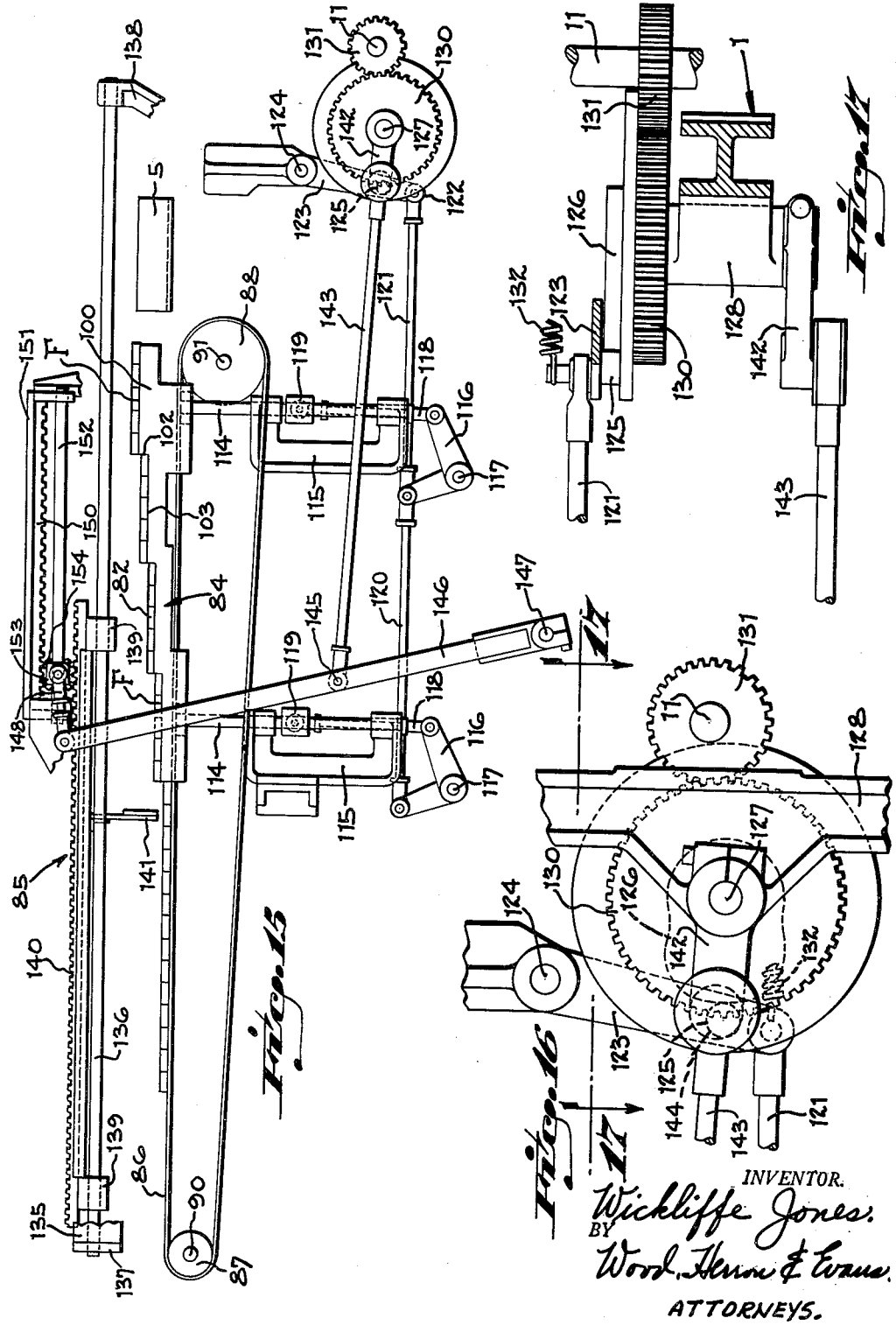

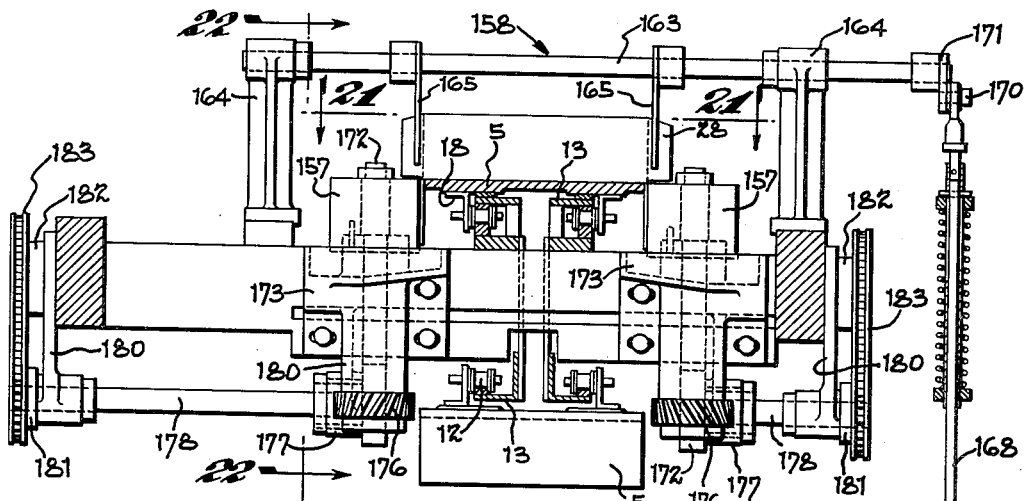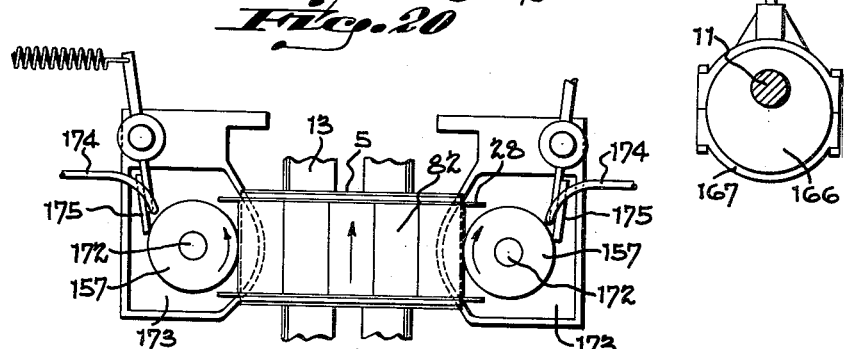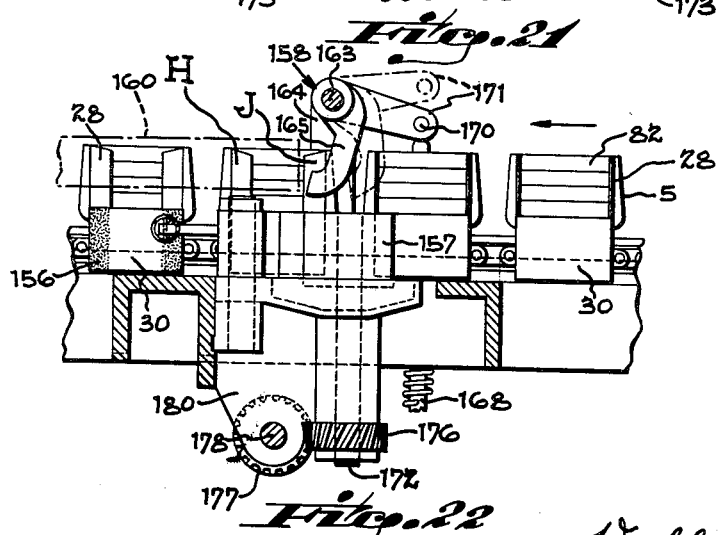

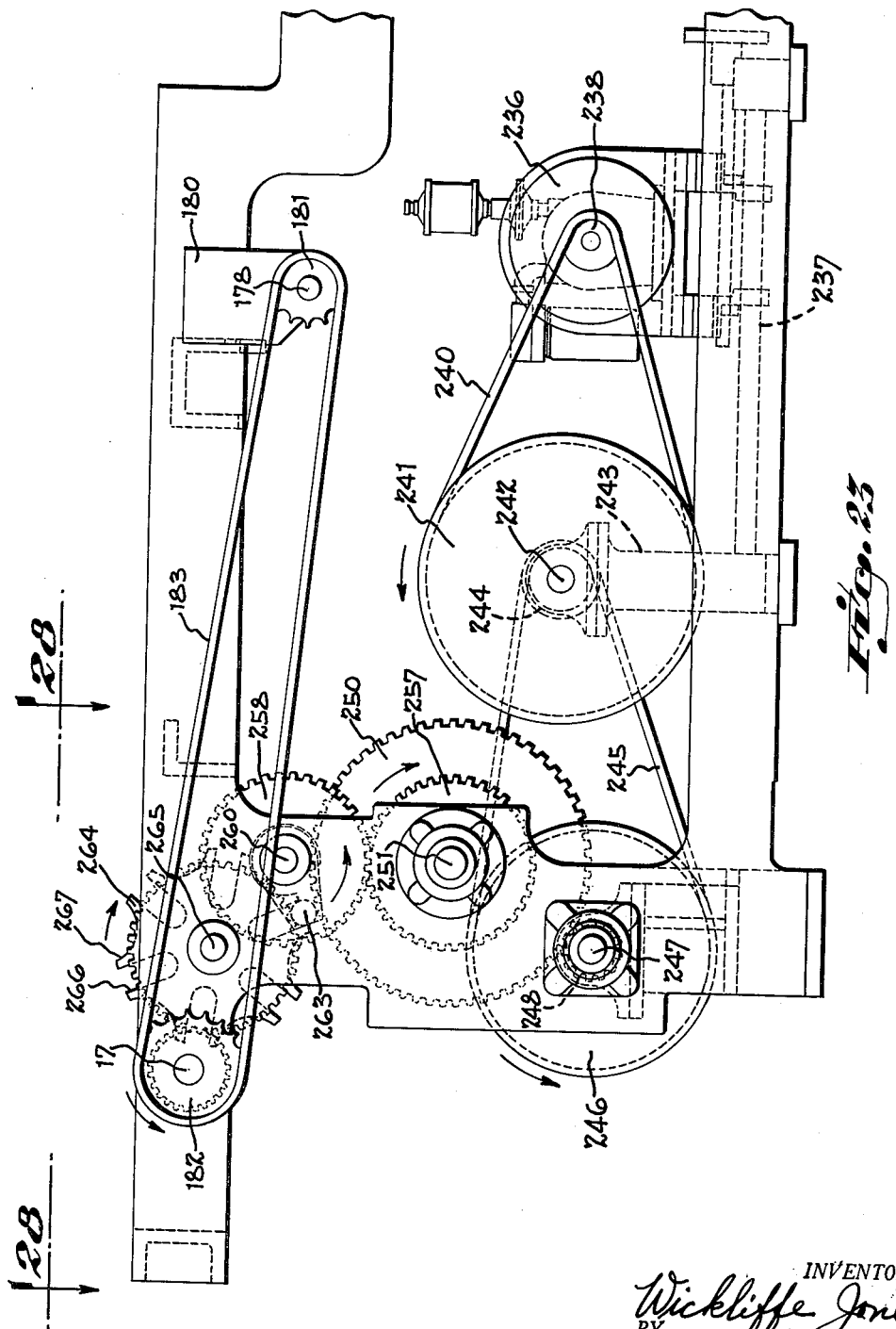

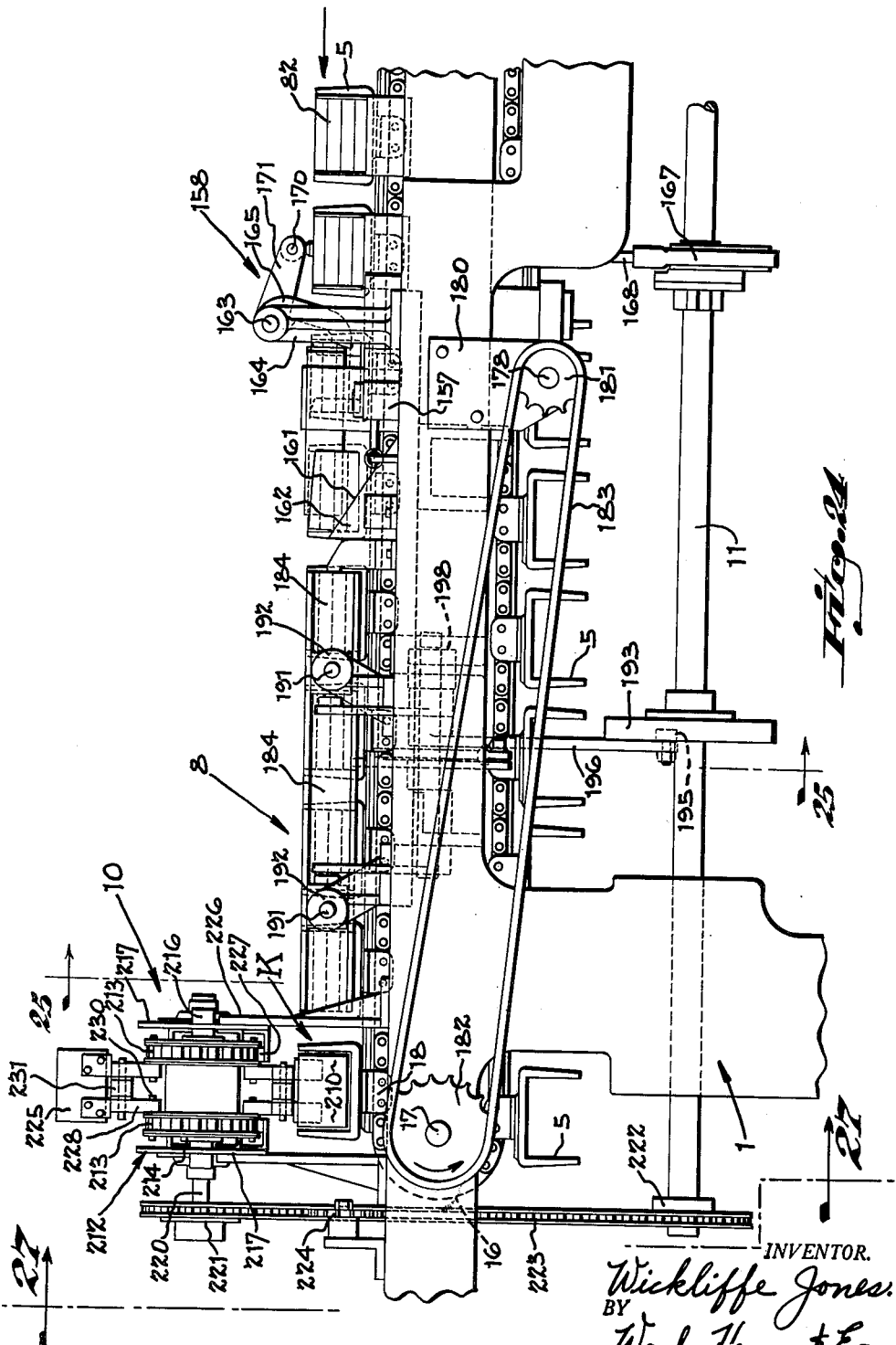

INVENTOR.
Wickliffe Jones
BY
Wood, Herron & Evans
ATTORNEYS.

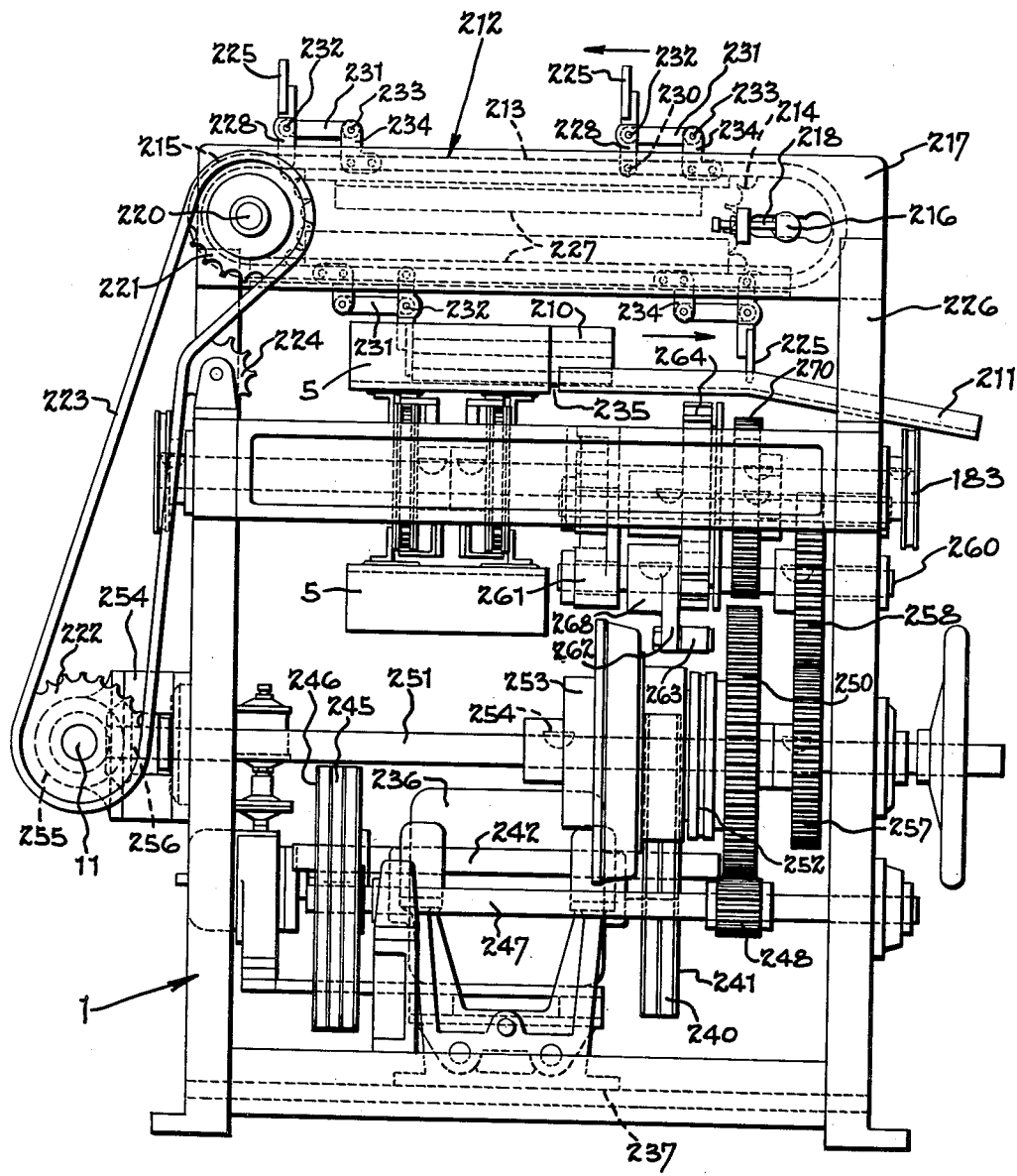

United States Patent Office 3,049,846
Patented Aug. 21, 1962

3,049,846
TRAY-TYPE CARTONING MACHINE
Wickliffe Jones, Cincinnati, Ohio, assignor to R. A. Jones and Company, Inc., Covington, Ky., a corporation of Kentucky
Filed Apr. 2, 1959, Ser. No. 803,712
11 Claims. (Cl. 53—164)

This invention relates to an automatic packaging machine of the type which loads articles in stack formation into an open, tray-type container which subsequently is closed and sealed to confine the articles.

One of the primary objectives of the present invention has been to provide a packaging machine wherein the containers are introduced into the machine in the form of flat blanks to be fed individually from a magazine, partially erected, then sequentially loaded, closed and sealed. In accordance with this aspect of the invention, the flat blanks cost a great deal less than the conventional carton which is partially erected and glued before being introduced into the cartoning machine in a knock-down condition.

Another objective has been to provide a simple structure for erecting the flat blanks and inserting them in a transport conveyor for subsequent advancement with respect to the article loading and sealing apparatus. According to this feature of the invention, the blanks are formed from an appropriate grade of paperboard, each blank having a pair of longitudinal score lines delineating a bottom and a pair of side walls, together with transverse score lines delineating main flaps and side flaps at opposite ends of the blank. Each blank is fed individually from the magazine to a position overlying the channel-shaped carrier bucket of an intermittently advancing transport conveyor. A tamping mechanism, mounted above the conveyor and operating in time with its advancements, forces the flat blank downwardly into the channel-shaped carrier, and in so doing, bends the blank along the score lines to create a channel-shaped tray with the flaps projecting outwardly at opposite ends. In this condition, the partially erected tray is advanced to the loading and sealing mechanisms.

A further objective has been to provide a structure wherein the articles of merchandise are packed into the partially erected tray, utilizing the contents of the tray as a support for the closure flaps as they subsequently are folded to a closed position and sealed with an adhesive under endwise pressure.

A further objective has been to provide a simple loading apparatus which re-forms a stream of advancing articles into a solid stack, consisting of several layers, and advances the stack longitudinally into the open end of the partially erected tray. After advancing from the loading apparatus, the contents of the package act as the internal support for the closure flaps during the subsequent folding, gluing and sealing operations, thereby simplifying these components of the machine.

Briefly, the loading apparatus comprises a pair of belt-type infeed conveyors arranged to advance the articles at random toward an elevating mechanism. At the inner end of each infeed belt, the articles, such as relatively small boxes, are arrested and re-formed into a solid row. Each elevating mechanism comprises spaced plates straddling the conveyor belt and engageable with opposite ends of the cartons which are arrested on the belt. The upper edges of these plates normally reside below the belt and are stepped to delineate a series of lands residing in horizontal planes one above the other. When the plates are elevated, these lands segregate the solid row of boxes into individual layers which subsequently are to form the stack. At the upper limit of motion, the elevating mechanism deposits the layers of boxes between spaced support elements or detent plates which slidably engage opposite ends of the layers; thereafter, a pusher advances the layers longitudinally toward the open end of the partially erected tray. In so doing, the several layers are re-arranged into stack formation and are introduced endwise through one end of the tray.

A further feature of the invention resides in a simplified mechanism for sealing the glued closure flaps of the tray after the articles are loaded into it, utilizing successive application of sealing pressure to set the wet glue.

After the trays are loaded, the side flaps are folded inwardly at opposite ends to overlie the contents of the tray, adhesive is applied to the main flaps, the main flaps are folded to bring the adhesive into facial contact with the previously folded side flaps, then the tray is advanced into the sealing apparatus. This apparatus essentially comprises a pair of opposed reciprocating bars and companion stationary bars engageable with the closed flaps. After the freshly glued flaps are folded to closed position, the tray dwells at the upstream end of the reciprocating bars, then the bars shift inwardly to apply pressure to the flaps from opposite ends. This sealing pressure is resisted by the stack of articles within the tray, as noted above. At the end of the dwell period, the pressure bars retract to allow the tray to advance through its next stepwise advancement, and during this motion, the stationary bars hold the flaps closed but do not apply pressure to them. At the end of the stepwise advancement, the reciprocating bars again apply pressure to the flaps; accordingly, endwise pressure is applied repeatedly until the flaps are permanently sealed. After emerging from the sealing station, the loaded trays are discharged from the machine.

The various features and advantages of the present invention will be more fully apparent to those skilled in the art from the following detailed description taken in conjunction with the drawings.

In the drawings:

FIGURE 1 is a perspective view, generally illustrating a packaging machine embodying the principles of the present invention.

FIGURES 2 to 6 inclusive illustrate in perspective the several operations of forming the tray from a flat paperboard blank; of bending and inserting the partially formed blank into the carrier or bucket of the conveyor; of introducing the merchandise endwise into the channel-shaped tray; and of closing and sealing the end flaps to complete the packaging of the merchandise.

FIGURE 7 is a fragmentary side view partially in section, illustrating the magazine feed mechanism which advances individual trays in blank form to the folding mechanism, subsequently to be bent to a channel shape and concurrently introduced into the buckets of the conveyor for stepwise advancement relative to the loading and sealing stations of the machine.

FIGURE 8 is an end view, as projected along lines 8—8 of FIGURE 7, further illustrating the blank feeding mechanism and a portion of the tray folding mechanism, the magazine being omitted for the sake of clarity.

FIGURE 9 is a fragmentary perspective view, generally illustrating the loading station which advances layers of merchandise into the trays after they have been folded and inserted into the buckets of the conveyor.

FIGURE 10 is a side elevation of the accumulating and loading mechanism as viewed along line 10—10 of FIGURE 9, showing the article pusher mechanism in its advanced loading position.

FIGURE 11 is a fragmentary top plan view taken along line 11—11 of FIGURE 10, further illustrating the loading mechanism.

FIGURE 12 is an enlarged fragmentary view taken from FIGURE 10, further illustrating the loading station and particularly the elevating apparatus which stations groups of merchandise at different elevations for transfer into the channel-shaped tray in respective layers.

FIGURE 15 is a fragmentary view similar to FIGURE 10, but showing the pusher mechanism in its retracted position ready to engage the segregated groups of articles which are supported by the detents of FIGURE 14 for endwise transfer into the erected tray.

FIGURE 16 is an enlarged fragmentary view taken from FIGURE 15, detailing the cam and linkage mechanism which reciprocates the article pusher apparatus.

FIGURE 17 is a partial section, as viewed along line 17—17 of FIGURE 16, further illustrating the cam and linkage of the pusher.

FIGURES 18 and 19 are diagrammatic views showing the segregated groups of merchandise in elevated position at the loading station, and showing the merchandise being reformed into superimposed layers during lateral transfer toward the open end of the tray. These views also represent an alternate arrangement for the elevating mechanism, as explained in the specification.

FIGURE 20 is a sectional view, taken along line 20—20 of FIGURE 9, illustrating the flap folding mechanism and glue rolls which act upon opposite ends of the tray after it advances from the loading station.

FIGURE 21 is a top plan view, taken along line 21—21 of FIGURE 20, further illustrating the glue applicator mechanism, the flap folders being omitted for clarity.

FIGURE 22 is a fragmentary sectional view, taken along line 22—22 of FIGURE 20, further illustrating the flap gluing and folding mechanism.

FIGURE 23 is a fragmentary side elevation as viewed from the side shown in FIGURE 9, showing the driving system which provides the intermittent advancement of the tray conveyor.

FIGURE 24 is a fragmentary view generally similar to FIGURE 23, showing the discharge portion of the machine and particularly the mechanism which seals the tray flaps after advancement beyond the folding and gluing station. This view also shows the discharge conveyor which shifts the finished packages laterally from the buckets of the carton conveyor at the discharge end of the machine.

FIGURE 27 is a view taken along line 27—27 of FIGURE 24, further illustrating the discharge conveyor and also the driving system of the machine.

FIGURE 28 is a fragmentary top plan, as viewed along line 28—28 of FIGURE 23, further illustrating the gear train, and particularly its driving connection with the intermittent transport conveyor.

General Arrangement

Figure 13:
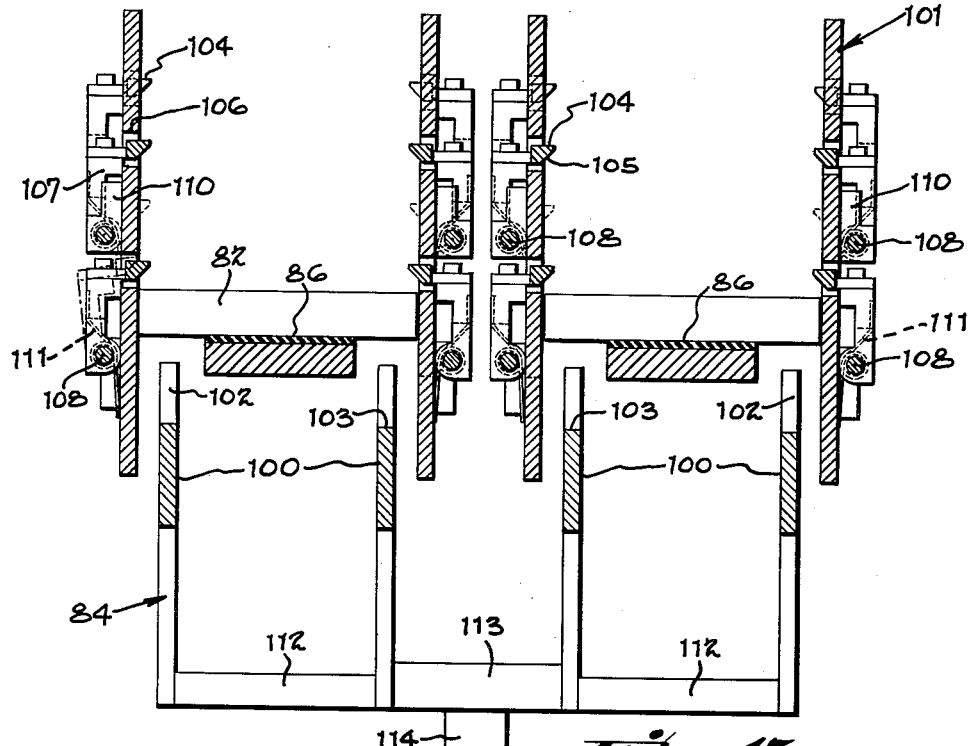
FIGURE 13 is a sectional view, taken along line 13—13 of FIGURE 12, detailing the detent apparatus which supports the articles in respective layers. In this view, the merchandise is in arrested position shown resting upon the conveyor belt, with the elevator plates in lowered position ready to shift the solid row upwardly to be grouped at several elevations.

Referring to FIGURE 1, the machine in general comprises a rigid frame 1, supporting an intermittent conveyor 2 which advances the trays or cartons with respect to the several components of the machine in the direction indicated by the arrow 5. At the loading end, the machine is provided with a magazine 3 which supports a stack of paperboard trays in flat blank condition. The magazine includes a feed mechanism, as explained later, which advances the flat blanks individually to a folding or tamping apparatus 4 residing above the conveyor, and the conveyor is provided with channel-shaped carriers or buckets 5 which are advanced intermittently with respect to the tray forming or tamping apparatus (FIGURE 2). The tray forming apparatus 4 pushes each tray blank downwardly into the respective conveyor buckets during conveyor dwell, and in so doing, folds the paperboard blank to a channel shape interfitting the conveyor bucket, as shown in FIGURE 3.

After the initial tray forming operation, the conveyor buckets, with their partially formed trays, advance to a loading station 6, at which point the merchandise is advanced laterally into the open end of the tray during the conveyor dwell period. As explained later, the loading station 6 includes a belt-type article conveyor which advances the merchandise, such as relatively small cartons, to a collecting station forming a part of the loading station. The collecting station reforms the articles, which advance in random fashion, into solid rows, then re-groups the row into several elevated planes one above the other. These rows are then laterally and endwisely advanced into the tray (FIGURE 4), such that the rows form layers of merchandise residing one upon the other within the tray.

During subsequent advancement of the conveyor buckets, the loaded trays are intercepted by a flap folding and gluing station, indicated generally at 7. At this station (FIGURE 5), the side wall flaps are folded inwardly to reside against the opposite ends of the merchandise, and liquid glue is applied to the downwardly folded main flaps.

The conveyor buckets now advance the filled trays to the flap closing and sealing station indicated at 8. During intermittent advancement through this station, the main flaps are folded to a closed position overlying the side flaps (FIGURE 6) such that the glued portions of each main flap reside in facial contact with the side flaps. Upon advancement through this station, sealing pressure is applied against the main flaps during the conveyor dwell periods and is released during the stepwise advancements, so as to set the adhesive bond between the flaps.

After the loaded trays are advanced through the sealing station 8, they dwell intermittently in registry with a discharge conveyor 10. The discharge conveyor 10 comprises a pair of chain runs extending transversely above the tray conveyor 2 and provided with pushers which advance through the channel-shaped buckets and thereby push the sealed trays laterally to a delivery chute. From the delivery chute, the loaded trays are advanced to a suitable machine which may apply a closure, such as a transparent wrapper, about the package, to envelope the merchandise.

The several components of the machine, described briefly above, are all operated in synchronism with the stepwise advancements of the tray conveyor 2. These components are all driven from the common drive shaft 11 which extends longitudinally of the machine. The drive shaft is provided with suitable cams and linkages for actuating the reciprocating components and for driving the conveyors, as explained in detail later.

Magazine Feed and Tray Conveyor

The magazine 3 and associated mechanism is viewed in FIGURE 7 from the side opposite that shown in FIGURE 1; consequently, the tray conveyor 2 is shown advancing in the opposite direction, as indicated by the arrow. As shown, the tray conveyor 2 comprises a pair of endless conveyor chains 12—12 (FIGURE 20) supported by suitable upper and lower chain guides 13 which are mounted upon the frame 1 of the machine. The conveyor chains are tracked about a pair of idler sprockets 14 carried on an idler shaft 15 at the loading end of the machine (FIGURE 7), shaft 15 being loosely journalled in the frame. The opposite end of the conveyor chains are tracked about a similar pair of sprockets 16 (FIGURE 24) which are carried upon a drive shaft 17. The drive shaft 17 is advanced intermittently by a driving system, including a Geneva gear, which is described later with reference to FIGURE 23. The driving system is arranged to advance the conveyor in steps, the length of which corresponds with the spacing of carriers or buckets 5. As shown in FIGURES 7 and 20, the buckets or carriers 5 are attached to the conveyor chains 12 by respective lugs 18 which extend from the bottom of each bucket at opposite ends. As the empty carriers pass around the idler sprockets 14, each bucket dwells beneath the folding or tamping station 4 to receive the blank tray which is fed from the magazine 3.

Referring to FIGURE 7, the magazine 3 comprises respective vertical angle members 20 supported with respect to frame 1 by a bracket 21 adjacent the loading end of the conveyor. The paperboard blanks, as indicated at A, are loosely confined in stack formation in the magazine and are advanced individually from the bottom of the stack by a feed mechanism indicated generally at 22. The feed mechanism advances the individual blanks horizontally from the magazine to a position engaging a stop 23, such that the blank resides above the stationary conveyor bucket 5. This blank is shown in FIGURE 7 in broken lines and is indicated at B. During the next cycle of operation, the tamping or folding apparatus forces the blank into the bucket, as indicated at C.

As shown in FIGURES 2 and 3, the blanks are scored longitudinally as at 24 to delineate a bottom 25 and side walls 26—26 upon being tamped into the bucket. The blanks are also provided with transverse score lines 27—27 which delineate respective pairs of side wall flaps 28—28 and main flaps 30—30. The mechanism for folding and gluing these flaps to enclose the merchandise is described later.

Described in detail (FIGURES 7 and 8), the feed mechanism 22 comprises two plungers which reciprocate in opposite directions relative to one another, one of the plungers separating the lowermost blank D from the stack in the magazine and the second plunger advancing the blank to the position previously indicated at B. In order to separate the lowermost blank from the stack, there is provided a suction cup 31 mounted upon an actuating rod 32 for vertical reciprocation below the magazine. The suction cup 31 is reciprocated in time with the feeder mechanism to contact the bottom of the stack and to spring the lowermost blank D downwardly a sufficient distance to permit entry of the separator plunger for subsequent advancement. For this purpose, the suction cup is interconnected with a suction apparatus which applies suction in time with the reciprocations of the cup. Since the suction apparatus is well known in the art, it has been omitted from the drawings.

In the position of the parts shown in FIGURE 7, the separator plunger, which is indicated at 33, is shown in its extended or separating position while the feed plunger indicated at 34 is in its retracted position. The separator plunger 33 advances from its retracted position as the suction cup draws the central portion of the blank downwardly from the stack, so that its forward end may pass into the space and separate the blank D from the stack. As shown in FIGURE 8, the separator plunger 33 is relatively narrow so as to reside at the central portion of the stack, while the feed plunger 34 resides below the separator and includes a pair of pushers 35—35 which straddle the separator and engage the edge of the separated blank D. The feed pushers include a thin nosepiece 36 (FIGURE 7) which prevents interference with the stack during its feeding motion.

During the cycle, the feed plunger 34 advances from the retracted position shown in full lines in FIGURE 7 to the extended position, shown in broken lines, to advance the sheet as at B, while the separator plunger 33 retracts. Thereafter, the feed plunger 34 also retracts, then the suction cup rises and engages the next lowermost blank. At this point, the separator plunger 33 again begins to advance for the next cycle of operation. As the separated blank is fed from the stack toward the stop 23, it is supported by guide plates 37 which extend from the magazine to the tamping station 4.

The separator and feed plungers are mounted for reciprocation relative to a bracket 38 (FIGURE 7) extending from the loading end of the machine frame. Bracket 38 includes respective pairs of guide bars at opposite sides (FIGURE 8), one pair being indicated at 40—40 and the other at 41—41. The feed plunger 34 is carried relative to the bars 40 by means of a cross head 42 slidably mounted on the bars 40 and connected by an angle bracket 43 to plunger 34. The separator plunger 33 is slidably supported by a cross head 44 on guide bars 41—41 through an angle bracket 45.

As best shown in FIGURE 7, the feed plunger 34 is reciprocated by an eccentric 46 and the separator plunger 33 is reciprocated by an eccentric 47, both mounted on a common cross shaft 48. The feed eccentric 46 includes a yoke 50 connected to a lever 51 by an acutating rod 52. The lower end of lever 51 is pivoted as at 53 to the bracket 38 and the upper end of the lever is linked as at 54 to the cross head 42 of the feed plunger 34.

The eccentric 47 of the separator plunger 33 includes a similar yoke 55 connected to a lever 56 by a rod 57. The lower end of lever 56 is also pivoted as at 53 to the bracket and its upper end is linked as at 58 to the cross head 42 of the separator plunger 33.

In order to reciprocate the suction cup 31, its mounting rod 32 is connected to a link 59 having a lower end pivotally connected to a bell crank lever 60 which is pivoted as at 61 to the bracket 38. The opposite end of bell crank lever 60 is linked as at 62 to the lever 56 of the separator plunger. Accordingly, the suction cup is elevated as the separator plunger is retracted from the magazine. In order to guide the rod 32 for vertical motion, its lower end includes a slide bracket 63 slidably carried upon a vertical guide bar 49 attached to bracket 38. The upper end of link 59 is pivotally connected to the slide bracket 63 in an offset position (FIGURE 8) to provide clearance for the angular displacement of the link 59. As shown in FIGURE 8, the cross shaft 48 which drives the feed mechanism has its opposite ends journalled relative to the frame 1 and its outer end includes a bevel gear 64 meshing with a bevel gear 65 mounted on the longitudinal drive shaft 11, previously indicated in FIGURE 1. The cams and eccentrics for the remaining components of the machine are mounted directly on the common shaft 11, such that the reciprocating parts all operate in time with one another. The common shaft 11 is in driving connection with the motor driving system and also with the Geneva drive which imparts stepwise advancement to the tray conveyor 2, as explained later.

*Tray Forming or Tamping Station*

The tray forming and tamping apparatus 4 is best shown in FIGURES 7 and 8 and comprises a presser foot 69 mounted upon a pair of vertical actuating rods 66 slidably journalled in a bearing fixture 67 adjacent the tray magazine 3. The fixture 67 is supported in stationary position by a bridge 68 rising from the frame 1 of the machine. The presser foot 69 normally resides in the elevated position shown in broken lines (FIGURE 7) as the tray blank is fed from the magazine to its position against stop 23 as shown at B. During the feeding motion, the conveyor advances the bucket into registry with the presser foot. It will be noted in FIGURE 7, that the support plate 37 is provided with an opening 70 having a width to permit the presser foot 69 to pass downwardly into the channel-shaped bucket 5, as shown in full lines in FIGURE 7. The width of the presser foot is slightly less than the width of the opening 70 and bucket 5. Accordingly, as the presser foot descends, it forces the central portion of the blank downwardly through the opening 70 toward the bucket.

The longitudinal score lines 24 of the blank (FIGURE 3) register with the opposite edges of the opening 70 when the blank resides against stop 23, thus causing the blank to be bent along the score lines to form the bottom 25 and side walls 26—26 as the presser foot forces the blank through the opening and tamps it downwardly into the bucket. Upon being forced into the bucket, the side walls of the blank tend to spring outwardly and thus hold the partially formed tray in place in the conveyor bucket.

As viewed in FIGURE 8, the tamping apparatus is reciprocated by an eccentric 71 mounted on the common longitudinal shaft 11. The eccentric 71 includes a yoke 72 pivotally connected to a lever 73 by a push rod 74. Lever 73 is pivotally connected as at 75 to the bridge 68 and its opposite end is pivotally connected as at 76 to a rod 77 which passes through a slide bearing 78. Rod 77 extends upwardly through bearing 78 and includes a compression spring 80 biasing the rod 77 upwardly. The bearing 78 is pivotally connected for rocking motion to a cross bar 81 which clampingly engages the actuating rods 66. Rotation of the eccentrics 71 thus imparts rocking motion to the lever 73 for raising and lowering the presser foot in time with the advancement of the conveyor buckets. The compression spring 80 provides a yieldable connection permitting the lever 73 to overtravel when the presser foot reaches its lower limit and engages the bottom of the bucket so as to prevent straining of the parts.

Loading Station

After the blank tray has been inserted into the conveyor bucket by the tamping apparatus 4, the intermittent transport conveyor advances the tray to the loading station 6, at which point the articles of merchandise, indicated at 82 (FIGURE 4), are advanced in group formation into the tray. In the present disclosure, the articles consist of small boxes of cough drops which are packaged in the tray for shipment to the retailer. As shown in FIGURE 4, the boxes are packed in four layers of five boxes each, making a total of twenty boxes per tray. After having been loaded, the end flaps are glued and sealed (FIGURES 5 and 6), then the wrapper subsequently may be applied. Upon being placed on sale, the retailer usually removes the wrapper and utilizes the tray itself as a display receptacle for the articles.

As described later in detail, the loading station 6 loads two trays during each operating cycle. For this purpose, its components are in duplicate and are timed to reciprocate once while the tray conveyor makes two stepwise advancements. In other words, the loading mechanism loads two side-by-side trays with merchandise, then shifts to a retracted position while the tray conveyor makes two stepwise advancements from the tray tamping mechanism 4. When two newly erected trays arrive at the loading station, the duplicate loading mechanism again advances the merchandise into the trays, then retracts. This cycle provides ample time for the loading apparatus to collect the articles and segregate them into layers, as explained in detail later.

In order to facilitate the loading and subsequent gluing and sealing operations, the main flaps 30 of the tray are folded downwardly to the position shown in FIGURE 4 before the tray reaches the loading station. For this purpose, there is provided a pair of flap retaining plates 79—79 (FIGURE 7) extending along opposite ends of the conveyor buckets, each plate having an inclined edge 89 which intercepts the main flaps 30 as the trays advance, so as to plow the flaps downwardly to the position shown. The flaps remain in this position as the trays advance to the loading station and until the loaded trays reach the gluing station (FIGURE 5), at which point the glue is applied to the flaps, after which they are plowed upwardly to be sealed.

The loading mechanism, as shown in FIGURE 9, includes an infeed conveyor 83 for advancing the articles 82 to the respective elevating mechanisms 84. As the articles are advanced toward the respective elevating mechanisms 84, they are arrested and reformed into solid rows on the conveyors; the two rows of articles subsequently are engaged by the elevators and segregated into individual layers (FIGURES 18 and 19) for lateral transfer into the trays by the loading plunger 85.

Described in detail (FIGURE 10), each infeed conveyor 83 comprises a pair of belts 86 tracked upon respective pulleys 87 and 88, the pulleys 87 comprising idlers, while the pulleys 88 drive the conveyor belts. The idler pulleys 87—87 are carried upon a common idler shaft 90 and the driving pulleys 88—88 are keyed to a common drive shaft 91 which is in driving connection with a conveyor motor (not shown) by way of a sprocket chain 92.

The conveyor shafts 90 and 91 are journalled in a conveyor frame 93 which extends at right angles to the main frame 1 of the machine. The conveyor frame includes a regulating pulley 94 which bears against the lower run of the conveyor belts 86 to apply tension to them. As shown in FIGURE 9, the conveyor frame 93 includes a series of guide rails 95 extending above the conveyor belts and parallel with them to guide the articles 82 as they advance in frictional engagement with the belts 86. The articles 82 are fed to the receiving end of the belt conveyor 83 and are advanced in the direction indicated by the arrow in FIGURE 10.

As the boxes 82 are advanced to the belts of the infeed conveyor, they reach a stop plate 96 (FIGURES 10 and 11) which arrests the articles and causes them to be reformed into a solid row on each conveyor belt. Each solid row forms a "prime" or accumulation of boxes, as indicated at E, which is subsequently segregated into layers by the respective elevating mechanisms 84. The rate of advancement of the conveyor belts is sufficiently greater than the operating cycles of the machine to provide a constant frictional drag urging the boxes against the stop plate 96.

As shown in FIGURE 9, each conveyor belt is provided with a low prime switch 97 including an arm 98 which rests upon the boxes which make up the accumulation E. The switches 97 are interconnected with an electrical circuit which controls the operation of the entire machine, with the exception of the motor which drives the infeed conveyor. In the event the prime row of either belt becomes depleted, the switch arm 98 of that belt drops by gravity, and through operation of the switches and control circuit, stops the entire machine while the infeed conveyor continues operating. When the prime row is restored and the arm elevated, the operation of the machine is resumed.

Figure 14:
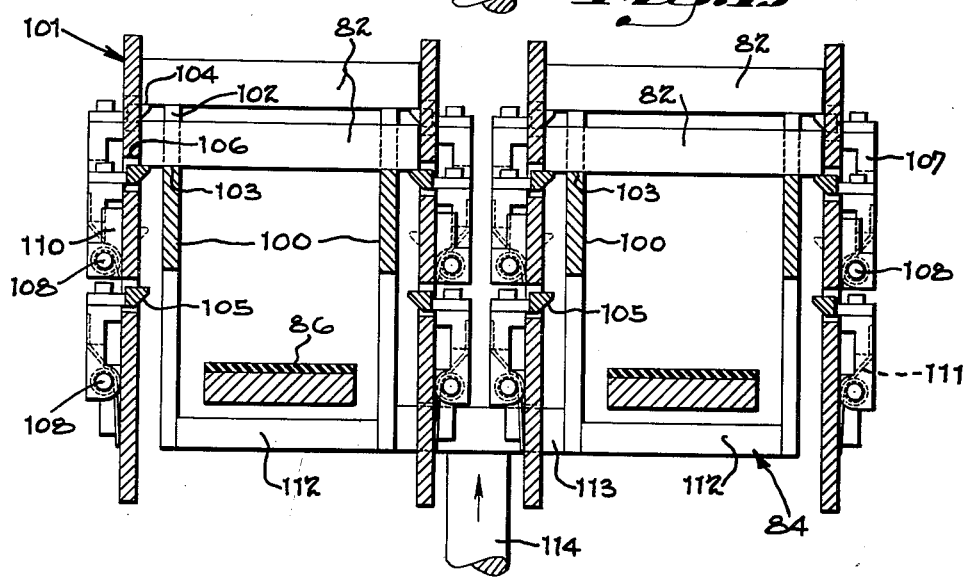
FIGURE 14 is a view similar to FIGURE 13, showing the elevator plates in elevated position with the articles supported in their respective planes by the detent mechanism.

As best shown in FIGURES 13–15, the elevating apparatus 84 comprises respective pairs of elevating plates 100—100 straddling the two infeed conveyor belts 86 in positions to engage the ends of the boxes 82 which project outwardly from opposite sides of the belts. As noted earlier, the boxes are guided in this position by the rails 95 of FIGURE 9. These rails lead to a pair of detent plates, indicated generally at 101, which loosely embrace the opposite ends of the boxes and support them in their elevated position, as shown in FIGURE 14. In order to segregate the row of boxes into layers, the upper edge of each elevating plate is stepped as at 102 to create four layer-supporting levels or lands 103 (FIGURE 15) for the respective layers of boxes, as indicated at F.

The elevating plates normally reside in the position shown in FIGURES 10 and 13 with their stepped lands 103 positioned below the path of travel of the boxes on the infeed conveyor belts. During this portion of the cycle, the main transport conveyor advances a pair of trays to the loading position indicated in FIGURE 11. Thereafter, the elevator plates are shifted upwardly so as to engage the opposite end portions of the boxes and raise them to the position shown in FIGURES 14 and 15. As the boxes are elevated relative to the detent plates 101, their opposite ends intercept a series of horizontal detent bars 104 which are arranged in planes corresponding to the lands 103 of the elevating plates. The downwardly presented surfaces of the detent bars 104 are inclined inwardly and upwardly as at 105, such that the detent bars are cammed outwardly to allow the boxes to pass. At the upper limit of travel the lands 103 of the elevator plates pass slightly above the upper edges of the detent bars to permit the bars to snap outwardly in a position to engage and support the opposite ends of the boxes. Thereafter, the elevator plates are shifted downwardly to the position of FIGURE 13 for the next cycle of operation.

As viewed in FIGURE 12, the length of the detent bars 104 corresponds to the lands 103 of the elevator plates; however, the lowermost detent bars, as indicated at G, extend end-to-end for the full length of the detent plates to support the two stacks of boxes as they are transferred to the trays at the loading station. As shown diagrammatically in FIGURES 18 and 19, the lowermost layer of boxes is first engaged by the loading plunger 85, then the successive layers are engaged in sequence and drop upon the layer below during the loading stroke to form stacks.

Described in detail with reference to FIGURE 12, the detent bars project through respective slots 106 formed in the elevator plates and are in duplicate, as shown in FIGURE 13. Each detent bar is carried by a pair of lugs 107—107 which are pivotally journalled upon respective rock shafts 108. The rock shafts are supported by bearing blocks 110 which are attached to the surface of the detent plates at opposite sides. The detent bars are urged inwardly by respective torsion springs 111 carried on the rock shaft, each spring having one end engaged against the lug 107 and its opposite end seated against the adjacent surface of the detent plate.

As best shown in FIGURES 13–15, the elevator plates 100 of each pair include a connector plate 112 and the respective pairs of plates are joined together by a central mounting plate 113. The plates as a unit are carried upon a pair of vertical slide bars 114 which are slidably mounted in respective C-shaped slide brackets 115—115 attached to the frame 1 of the machine (FIGURES 10 and 15). Vertical motion is imparted to the slide bars by respective bell crank levers 116—116 journalled as at 117 for rocking motion relative to the machine frame, each bell crank lever having a link 118 pivotally connected as at 119 to its slide bar 114. The opposite ends of the bell crank levers 116 are linked together as at 120; link 120 includes an extension 121 pivotally connected as at 122 to a cam lever 123 having its opposite end pivotally connected as at 124 relative to the machine frame. Cam lever 123 (FIGURE 16) includes a follower 125 tracked against a cam 126 which is mounted upon a stub shaft 127 and the shaft is journalled in a bracket 128 attached to the machine frame. The cam includes a gear 130 meshing with a pinion 131 which is attached to the longitudinal drive shaft 11. As shown in FIGURES 16 and 17, the cam lever 123 is constantly biased toward cam 126 by a tension spring 132 having one end anchored to the lever and its opposite end anchored to the machine frame.

It is to be noted that the gear and pinion drive provides a 2 to 1 driving ratio from shaft 11 to the cam 126, such that the cam and linkage system reciprocates the elevating mechanism 84 through one cycle of operation, while the remaining components of the machine operate through two cycles, thereby to load two side-by-side trays during each loading cycle. The loading apparatus 85 is also reciprocated by the gear 130 and pinion 131 in time with the movements of the elevating apparatus. In the position of the parts shown in FIGURE 15, the loading apparatus is dwelling in its retracted position, and the elevating mechanism 84 has shifted to its elevated position to shift the boxes to the detent bars (FIGURE 14). Thereafter, the loading apparatus will advance from the retracted position to the loading position shown in FIGURE 10, so as to reform the segregated layers of boxes into stack formation and to shift the stacks laterally into the open ends of the pair of trays at the loading station (FIGURES 11, 18 and 19).

As shown in FIGURE 14, a substantial air gap exists between the articles 82 which are supported in elevated position upon the detent bars 104. As a consequence, the articles drop downwardly to the stack below as they reach the end of the detent bars during transfer by the pusher 141 (FIGURES 18 and 19). In certain types of articles, the drop-off at the end of the detent bars causes the upper layers of articles to become disarranged, thus preventing the proper transfer of the stack into the tray. In order to overcome the problem in such cases, the effective thickness of the detent bars is reduced, as shown diagrammatically in FIGURES 18 and 19. These alternate forms of detent bars may be of sheet metal having a thickness of $\frac{1}{16}$ of an inch, thus reducing the air gap and providing a smoother transfer action. The thin detent bars may be hingedly connected to the detent plates so that the bars are free to tilt upwardly to permit the articles 82 to be elevated between the detent plaes to the position shown in FIGURE 14.

In other instances, the air gap is reduced by mounting the detent bars in planes which slope slightly in the downward direction, so that the longitudinal slope of the top surface of the bars substantially compensates for the thickness of the bar, thereby to decrease the air gap (FIGURE 12). It has been found in practice that most of the difficulty is eliminated if the two upper bars 104 are sloped downwardly as indicated by the broken lines at L in FIGURE 12.

As shown in FIGURE 11, the stop plate 96, previously described with reference to the infeed conveyor, is provided with respective pairs of loading gates 133—133 carried upon studs 134 rising from the stop plate. The studs are biased by springs (not shown) in a direction to hold the gates in their closed position, as shown in broken lines so as to provide clearance for the end flaps 28 of the trays as they advance to loading position. When the loading mechanism shifts the stack of boxes into the tray, the boxes swing the gate to the open position, as indicated, thus springing the flaps 28 outwardly to prevent interference with the articles. After the loading mechanism retracts, the gates are sprung to their closed position by the biasing springs.

The loading mechanism 85 is reciprocated with respect to a lateral frame 135 (FIGURES 9 and 10) which projects in cantilever fashion above the infeed conveyor 83. A pair of guide bars 136—136 have their outer ends supported as at 137 in frame 135 and extend laterally across the main frame 1 of the machine to a pair of brackets 138—138 which, as best shown in FIGURE 1, rise from the framework 1 of the machine. Respective spaced cross heads 139—139 are slidably mounted upon the bars 136, and a driving rack 140 has its opposite ends attached to the cross heads. The rack 140 is located parallel with and between the slide bars 136 (FIGURE 1) and a pair of article pushers 141—141 (FIGURE 11) projects downwardly from the rack for engaging the articles after they have been elevated to the detent bars.

In the retracted position shown in FIGURE 15, the pushers 141 reside in alignment with the respective pairs of detent plates 101 and pass between the spaced plates during the transfer stroke. During the transfer stroke, the elevator plates 100 are in their lowered position (FIGURE 13) below the path of travel of the pushers 141, allowing the pushers to advance the articles along the detent bars 104, as pointed out earlier with respect of FIGURES 18 and 19 and to force the articles through the loading gates 133. At the end of the loading stroke the pushers 141 reside in the position shown in FIGURE 11.

The loading mechanism 85 is reciprocated by a crank 142 (FIGURES 15–17) which is attached to the stub shaft 127 of cam 126. A link 143 is connected to the crank pin 144 and has its opposite end pivotally connected as at 145 to a pair of loading levers 146. In order to balance the forces, the loading levers are duplicated at opposite sides of frame 135 and the connection 145 consists of a cross bar joining the two levers together. The levers 146—146 are pivotally connected as at 147 to frame 135 and their upper ends include links 148—148 which are in driving connectoin with the loader rack 140 at opposite sides.

As shown in FIGURES 10 and 15, the loading mechanism includes a stationary rack 150 mounted parallel with rack 140, with its teeth facing the teeth of rack 140. The stationary rack is supported by a bridge structure 151 rising from the frame 135. The bridge structure includes a second pair of slide bars 152—152 having a cross head 153 (FIGURE 9) slidably mounted thereon. Cross head 153 is pivotally connected to the link 148 of the loading lever for reciprocation along the slide bars 152. A pinion 154 is journalled as at 155 (FIGURE 10) on cross head 153 and meshes with the opposed teeth of the racks 140 and 150. Accordingly, the rolling action of pinion 154 reciprocates the rack 140 and pushers 141 over a range which is twice the linear range of motion of the pinion through the reciprocations of the loading lever 146, as shown in FIGURES 10 and 15. As noted earlier, the elevating cam 126 and crank 142 are arranged to reciprocate the elevating and loading mechanisms in time with one another. After the boxes have been transferred into the trays, as shown in FIGURE 11, the loading mechanism retracts the pushers 141, the loading gates 133 close, and the transport conveyor advances the loaded trays to the flap folding and gluing station, previously indicated at 7.

*Flap Folding and Gluing Station*

As the loaded trays advance from the loading station, the side flaps 28 and main flaps 30 of the trays remain in the position shown in FIGURE 4 and the loaded tray is advanced to the flap folding and gluing station, previously indicated at 7 in FIGURE 1. Upon reaching this station, a pattern of wet glue, as indicated at 156 in FIGURE 5, is applied to the main flaps 30—30 by a pair of glue rollers indicated at 157 in FIGURES 20-22. As shown, the glue rollers track against the surface of the main flaps 30 at opposite ends of the tray, in a plane below the side flaps 28.

After passing between the glue rollers the side flaps 28 on the trailing side of the tray are folded to a closed position by a flap folding apparatus indicated generally at 158 (FIGURE 22). The flaps on the leading side are closed by stationary flap closer plates 160, and finally the main flaps 30 are plowed to a closed position by the inclined edges 161 of the flap closing plates 162—162 (FIGURE 24). As viewed in FIGURE 26, the closer plates 162 converge toward the sealing station 8 so as to close the flaps progressively. When the main flaps 30 are completely closed, the pattern of liquid adhesive is placed in facial contact with the previously folded side flaps 28, and the tray is then advanced through the flap sealing station 8, where the folded flaps are sealed. It will be observed that during the flap folding and sealing operations, the stack of boxes within the tray provides a backing which supports the flaps and thus facilitates closing and sealing operations.

Described in detail with reference to FIGURES 20-22, the flap closing apparatus comprises a rock shaft 163 extending across the transport conveyor and journalled for rocking motion in a pair of bearing brackets 164—164 rising from the machine frame. Opposed flap closers 165—165, keyed to rock shaft 163, are engageable with the side flaps 28 on the trailing side of the tray as shown in FIGURE 22. The rock shaft is reciprocated in time with the stepwise advancements of the conveyor to swing the flap closers from the position shown in broken lines to the position shown in full lines. Thus, as the transport conveyor advances the tray, the side flaps on the leading side, as indicated at H (FIGURE 22) are intercepted by the ends of the closer plates 160 and folded to closed position, then the flap closers swing to the position shown in full lines to close the flaps on the trailing side, as indicated at J as they approach the ends of the plates 160.

As shown in FIGURE 20, the swinging flap closers 165 are actuated by an eccentric 166 mounted on the common drive shaft 11 and having a yoke 167. An actuating rod 168 projects from the yoke as its upper end is pivotally connected as at 170 to an arm 171 (FIGURES 22 and 24) projecting from the rock shaft 163. The eccentric 166 and associated linkage shifts the swinging flap closers 165—165 in time with the stepwise advancements of the tray from the loading station, as explained above.

As noted earlier, the wet adhesive is applied to the flaps by the opposed rolls 157 which are rotated in the direction of tray advancement, as indicated by the arrows in FIGURE 21. Each glue roller is mounted upon a vertical drive shaft 172 projecting upwardly through the respective glue sumps 173—173 which collect the glue as it drains from the rolls. The liquid glue is supplied to the rolls by the supply conduits 174—174 (FIGURE 21) and the excess glue is scraped from the rolls by the respective spring-loaded scrapers 175—175 which bear against the periphery of the rollers. The glue drains from the sumps 173 to a suitable pumping apparatus (not shown) to be re-circulated back to the rolls by way of the conduits 174. The periphery of each glue roll includes a suitable printing area, such as a roughened surface, to print the pattern 156 (FIGURE 5) on the advancing flap, while the scraper removes the glue from the smooth surface of the roller. Since the gluing apparatus is well known in the art, the structural details have been omitted from this disclosure.

For rotating the glue rolls 157, the lower end of each drive shaft 172 includes a helical gear 176 meshing with a driving gear 177 mounted on the respective cross shaft sections 178—178 (FIGURES 20 and 22). The cross shaft sections are journalled in bearing brackets 180—180 carried by the machine frame. The outer end of each shaft section 178 includes a driven sprocket 181 in driving connection with a pair of driving sprockets 182—182 through a sprocket chain 183 (FIGURES 23 and 24). The driving sprockets are keyed to the drive shaft 17 of the intermittent transport conveyor, as shown in FIGURE 28, such that the glue rolls are advanced intermittently with the transport conveyor. The driving ratio is such that the printing areas of the glue rollers register with the edge portions of the main flaps 30 to properly locate the glue patterns 156—156. The gear train which drives the several components is described later with reference to FIGURES 23, 27 and 28.

*Flap Sealing Apparatus*

Figure 25:
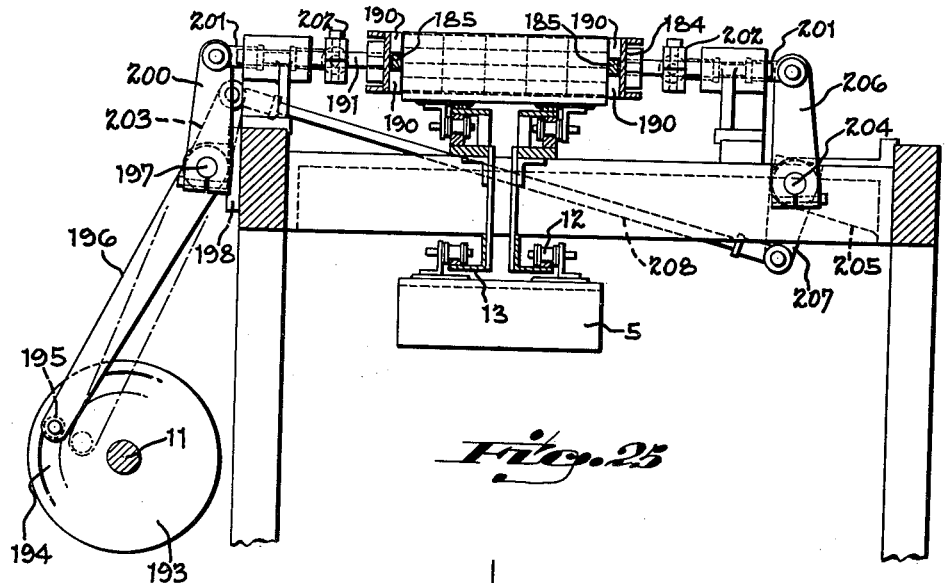
FIGURE 25 is a fragmentary sectional view, taken along line 25—25 of FIGURE 24, further illustrating the flap sealing mechanism in relation to the carton conveyor.
Figure 26:
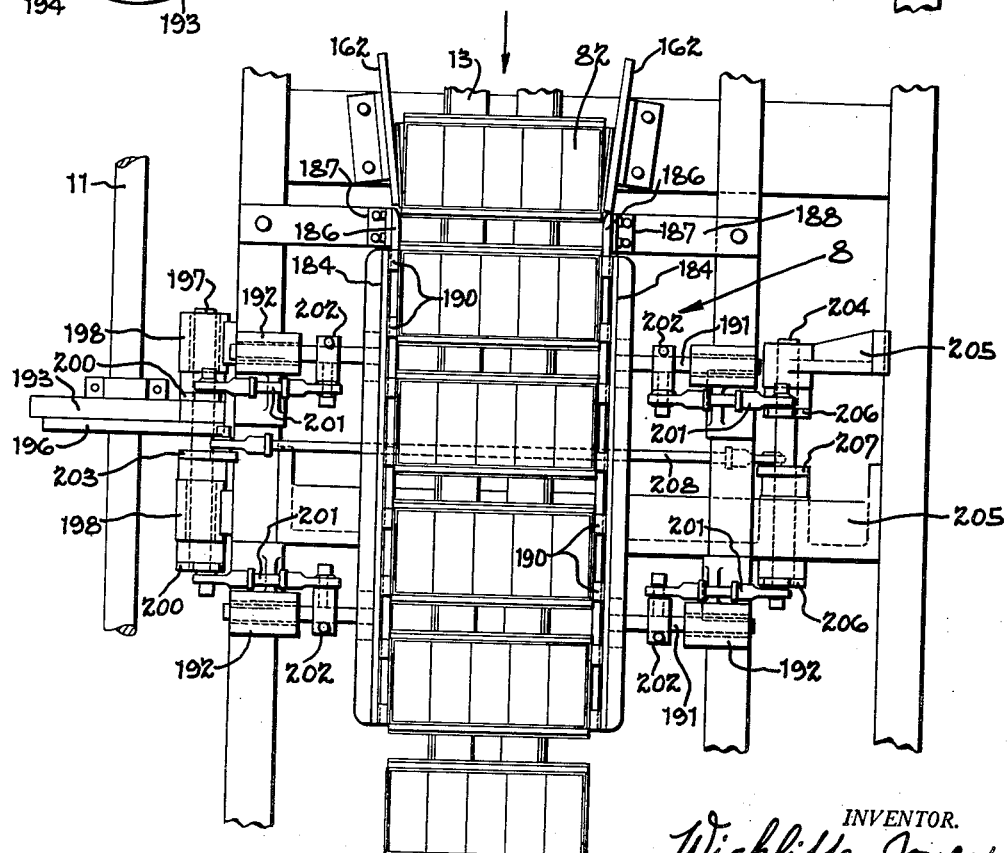
FIGURE 26 is a top plan view projected from FIGURE 25, further detailing the flap sealing mechanism.

As noted above, the tray advances from the folding and gluing station 7 with the side flaps 28 closed and with the main flaps 30 freshly glued (FIGURE 5). During the next stepwise advancement, the freshly glued main flaps 30 are progressively closed by the plates 162 (FIGURES 24 and 26), as the tray approaches the receiving end of the sealing station 8, where pressure is applied intermittently to the closed flaps 30 during the conveyor dwell periods (FIGURES 24–26). The pressure is applied by the opposed reciprocating bars 184—184 which reside along opposite sides of the transport conveyor in a position to engage the flaps at opposite ends. As viewed in FIGURES 25 and 26, the reciprocating bars 184 coact with respective stationary bars 185—185 having leading ends 186 which reside adjacent the downstream ends of the closer plates 162—162. The stationary bars 185 establish a sliding contact with the closed end flaps 30 as the trays advance through the sealing section. As explained in detail below, the bars 184 are shifted outwardly to a release position during the stepwise advancement of the tray and are shifted into pressure engagement with the flaps during the conveyor dwell period. During the advancement of the trays with the reciprocating bars 184 open, the stationary bars 185 keep the flaps closed until pressure again is applied by the reciprocating bars during the next dwell period.

Described in detail (FIGURES 24, 25 and 26), the stationary bars 185 are supported by brackets 187—187 mounted upon a suitable framework 188. Each reciprocating bar 184 is generally channel-shaped in cross section and includes sets of upper and lower presser blocks 190 straddling the stationary bars 185. The blocks 190 are located to register with the glue patterns 156—156 of the flaps so as to localize the sealing pressure which reacts against the boxes packed in the tray. The sets of blocks are located to register with the ends of the several trays during intermittent advancement through the sealing station.

The reciprocating bars 184 are supported by opposed pairs of slide rods 191—191 having outer portions slidably supported in respective slide bearings 192—192 mounted on the frame at opposite sides of the transport conveyor. The reciprocating bars are actuated in time with the conveyor by a cam 193 mounted on shaft 11 and having a closed track 194 in running engagement with a follower 195 of a cam lever 196. The upper end of cam lever 196 is clamped to a rock shaft 197 which is journalled in a pair of bearing brackets 198—198 (FIGURE 26). Clamped to the rock shaft is a pair of actuating arms 200—200 extending above the rock shaft 197. The upper ends of the two arms 200 include pivoted links 201—201 connected to the lugs 202—202 of the respective slide rods 191 which support the left hand reciprocting bar 184.

The rock shaft 197 further includes a third actuating arm 203 projecting upwardly between the arms 200 for actuating the right hand reciprocating bar 184. For this purpose, there is provided a rock shaft 204 journalled in bearings 205—205 on the right hand side of the conveyor and having clamped thereto a pair of actuating arms 206—206 similar to the arms 200. The arms 206 are connected by similar links 201 and lugs 202 to the slide rods 191 of the right hand bar 184. The rock shaft 204 includes a downwardly extended arm 207 connected by a link 208 to the third arm 203 of rock shaft 197.

The arrangement is such that cam lever 196 resides in the position shown in full lines during the conveyor dwell period to apply pressure to the flaps through the opposed bars 184—184; the cam then shifts the lever to the position sshown in broken lines to release the bars during stepwise advancement of the conveyor. Therefore, sealing pressure is applied to each tray four times during advancement between the opposed bars so that the glue is thoroughly set as the trays advance beyond the sealing station 8.

*Discharge Station*

As the loaded trays are advanced intermittently from the downstream end of the sealing station 8 (FIGURES 24 and 27), each tray dwells, as indicated at K, in alignment with the discharge station 10. During the dwell period, the sealed tray 210 is discharged laterally from its conveyor bucket or carrier 5 to a delivery chute, indicated generally at 211, which is mounted in a stationary position adjacent the end of the conveyor carrier at the unloading station. From the delivery chute, the trays may be fed to a conveyor for advancement through a wrapping machine or other handling equipment.

Described in detail (FIGURES 1, 24 and 27), the unloading station comprises an overhead pusher mechanism 212 having a pair of sprocket chain runs 213—213 passing about a pair of idler sprockets 214—214 at one end and driving sprockets 215—215 at the opposite end. The idler sprockets 214 are carried upon an idler shaft 216 having opposite ends slidably mounted relative to a pair of spaced mounting plates 217—217. Respective adjustment screws 218, engaging shaft 216, regulate the tension of the chain runs 213. The driving sprockets 215 are mounted upon a drive shaft 220, also journalled in the mounting plates 217 and driven by a sprocket 221 keyed to the drive shaft 220. The chain runs 213 are advanced in time with the other components of the machine by a sprocket 222 carried on the main drive shaft 11 and in driving connection with sprocket 221 through a chain 223. A slack control sprocket 224 meshing with chain 223 is journalled relative to the frame 1.

As best shown in FIGURE 24, the chain runs 213—213 advance a series of pushers 225 which loosely interfit the channel-shaped carriers 5 of the intermittent conveyor. The mounting plates 217 are supported by upright elements 226 at the required elevation, and the chain runs 213 are supported by respective chain guides 227 relative to the carriers 5. In order to provide a feathering action, each pusher 225 is mounted upon a pair of fingers 228—228, the inner ends of which are pivotally connected as at 230 to the chain runs 213 for relative swinging motion. Each pair of fingers 228 includes a link 231 (FIGURE 27) pivotally connected as at 232 to the fingers and extending in trailing relationship to the direction of chain advancement, as indicated by the arrow. The rearward end of each link is pivotally connected as at 233 to a pair of lugs 234 projecting outwardly from the chain runs 213. Accordingly, the pushers 225 remain in a vertical position as they begin to pass upwardly about the idler sprockets 214 after having advanced the sealed tray 210 from the carrier 5 to the delivery chute 211. During the feathering motion, the pusher rises above the tray so as to deposit the tray in the outer portion of the chute 211. The action of the link and lug arrangement creates a similar feathering action as the pushers pass downwardly around the driving sprockets 215.

The chute 211 is generally channel-shaped, conforming to the configuration of the carriers, but somewhat larger to facilitate transfer of the sealed tray from the carrier without interference. As seen in FIGURE 27, the inner edge of the chute is positioned closely adjacent the end of the carrier as indicated at 235 to avoid interference as the tray is transferred.

According to the present disclosure, the unloading mechanism is provided with four pushers 225 which are advanced continuously by the common drive shaft 11 through chain 223. The timing is such that a carrier 5 advances to the unloading station while one of the pushers is passing about the driving pulley; thereafter, the carrier dwells for a sufficient period for the pusher to pass through the carrier to transfer the sealed tray to the chute before the end of the dwell period. The empty carrier 5 passes downwardly about the idler sprocket 16 of the transport conveyor during subsequent advancements.

*Driving System*

The entire machine, with the exception of the infeed conveyor 83, is driven by an electric motor indicated at 236 in FIGURES 1, 23, 27 and 28. The motor is adjustably mounted with respect to a base member 237 (FIGURE 23) of the machine frame and includes a pulley 238 belted as at 240 to a sheave 241 carried upon a counter shaft 242 journalled as at 243. A small pulley 244 on counter shaft 242 is belted as at 245 to a second sheave 246 mounted on a second counter shaft 247 journalled in the frame 1. The belt and pulley system preferably is of the V-belt type and provides a reduction drive from the motor to shaft 247 which forms a part of the gear train.

As best shown in FIGURE 27, a pinion 248, keyed to counter shaft 247 meshes with a clutch gear 250 mounted upon a cross shaft 251 also journalled in frame 1. Gear 250 is rotatable relative to shaft 251 and is attached to the driving element 252 of an electric clutch having a driven element 253 which is keyed as at 254 to shaft 251.

It is to be noted that upon being energized, the electric clutch establishes a driving connection from gear 250 to shaft 251. The low prime switches 97 previously described with reference to the infeed conveyor 83 (FIGURE 9) are interconnected in circuit with the electric clutch to energize and engage the clutch under normal conditions, and to disengage the clutch in response to the depletion of the prime rows of boxes 82 on the infeed conveyor. Cross shaft 251 drives the common drive shaft 11 which rotates continuously and also drives a geneva motion which provides the intermittent operation of the main transport conveyor and glue rollers. As best shown in FIGURES 1, 27 and 28, the common shaft 11 is journalled in bearing blocks 254 attached to the frame 1; and includes a bevel gear 255 meshing with a bevel gear 256 keyed to shaft 251 of the electric clutch. Bevel gears 255 and 256 provide the driving connection from cross shaft 251 to the longitudinal shaft 11 which actuates the reciprocating components of the machine.

To provide the conveyor drive, cross shaft 251 includes a second gear 257 keyed to the shaft adjacent the clutch gear 250. Gear 257 meshes with a gear 258 which is keyed to a shaft 260 forming a part of the geneva drive (FIGURES 27 and 28). Shaft 260 has one end journalled in the machine frame and its opposite end journalled in a bearing bracket 261.

A geneva arm 262 is keyed to shaft 260 and carries a roller 263 which acts upon a geneva wheel 264 keyed to an intermittent geneva shaft 265 (FIGURE 23). The wheel 264 includes radial slots 266 and arcuate faces 267. As viewed in FIGURE 23, the geneva roller 263 advances in the direction indicated by the arrows and traverses one slot 266 upon each revolution to impart rotary motion to the geneva wheel in the direction indicated. During the dwell period one of the arcuate faces 267 of the wheel interfits the hub 268 (FIGURE 27) of the geneva arm to lock the wheel against rotation, according to common practice.

Referring to FIGURE 28, the geneva shaft 265 includes a gear 270 keyed to shaft and meshing with a pinion 271 which is keyed to the drive shaft 17 of the intermittent transport conveyor 2, as described earlier. As shown in FIGURE 28, the drive sprockets 16 of the transport conveyor are keyed as at 272 to shaft 17 to impart the stepwise advancements of the geneva wheel to the conveyor chains. The intermittent motion is also imparted to the glue roll 157 through the sprocket chains 183—183, as described earlier.

Having described my invention, I claim:

1. A packaging machine for folding, loading and sealing blank containers formed of relatively stiff sheet material and having overlapping closure flaps at opposite ends thereof, said machine comprising, a magazine for confining a stack of containers in flat blank form, an intermittent transport conveyor including a channel-shaped carrier having an open face, a tamping mechanism having a foot element normally disposed above said conveyor and movable downwardly into the open face of the carrier during a conveyor dwell period, said foot element loosely interfitting the interior of the channel-shaped carrier, feed means associated with said magazine for advancing said container blanks individually from said magazine to a position interposed between said foot element and the open face of the channel-shaped carrier, whereby said foot element folds said blank generally into channel-shaped tray configuration and inserts the tray directly into said carrier upon movement of the foot element from said normal position into the carrier, an article loading mechanism disposed along said conveyor downstream from said tamping mechanism, said loading mechanism adapted to transfer articles in stack formation endwisely into the tray residing in the carrier during a conveyor dwell period, means for applying adhesive to said closure flaps and for folding said flaps to an overlapped closed position upon advancement of the tray from said loading mechanism, and means for applying pressure to said folded flaps upon advancement thereof from said folding means, said pressure applying means sealing the flaps and utilizing the articles within the container to support the flaps upon application of pressure thereto.

2. A packaging machine for folding flat blank containers for loading and sealing the same, said blank containers formed of relatively stiff sheet material and having overlapping closure flaps at opposite ends thereof, said machine comprising, an intermittent transport conveyor having spaced channel-shaped carriers, tray forming means normally disposed outwardly from the path of travel of said carriers and movable inwardly into said carriers during the dwell periods of said intermittent conveyor, means for advancing said blank containers individually to a position interposed between said tray forming means and carrier, said tray forming means loosely interfitting the interior of said channel-shaped carrier, whereby said flat blank is folded to the form of a channel-shaped tray and pressed directly into said channel-shaped carrier upon inward motion of the forming means, an article loading mechanism disposed along said conveyor downstream from said tray forming means, said loading mechanism including means for reforming said articles into stack formation comprising rows of articles resting one upon another and for inserting said stack endwisely into said channel-shaped tray during a conveyor dwell period, means located along the transport conveyor downstream from said loading mechanism for applying adhesive to said closure flaps and for folding the same inwardly in overlapping relationship across the stack of articles, and means located downstream from said flap folding means for applying pressure endwisely to said flaps from opposite ends of the tray, thereby to permanently seal the flaps, utilizing the articles packed therein to support the flaps during the application of sealing pressure thereto.

3. A packaging machine for folding flat blank containers and for loading and sealing the same, said blank containers having closure flaps at opposite ends thereof, said machine comprising, an intermittent transport conveyor having spaced channel-shaped carriers, tray forming means normally disposed outwardly from the path of travel of said carriers and movable inwardly into said carriers during a dwell period of said intermittent conveyor, means for advancing said blank containers individually to a position interposed between tray forming means and carrier, said tray forming means loosely interfitting the interior of said channel-shaped carriers, whereby said flat blank is folded to the form of a channel-shaped tray and pressed directly into the said channel-shaped carrier upon inward motion of the tray forming means, an article loading mechanism disposed alongside said conveyor downstream from said tray forming means, said loading mechanism comprising infeed conveyor adapted to advance articles toward the transport conveyor, means for arresting the articles and re-forming the articles into a solid row on the infeed conveyor, and means for grouping the solid row of articles into stack formation with groups of articles resting one upon another and for inserting said stack endwisely into said channel-shaped tray during a conveyor dwell period, means located along the transport conveyor downstream from said loading mechanism for applying adhesive to said closure flaps and for folding the same inwardly across the stack of articles, and means located downstream from said flap folding means for applying pressure endwisely to said flaps from opposite ends of the tray, thereby to permanently seal the flaps, utilizing the articles packed therein to support the flaps during the application of sealing pressure thereto.

4. A packaging machine for forming trays from flat banks and for loading and sealing the same, said blank containers formed of relatively stiff sheet material and having overlapping closure flaps at opposite ends, said machine comprising, a transport conveyor having spaced tray carriers, tray forming means mounted relative to the conveyor and adapted to fold a flat blank to the form of a channel-shaped tray and to press the same directly into said carrier, an article loading mechanism located along said conveyor downstream from said tray forming means, said loading mechanism comprising, means for advancing articles toward the transport conveyor in a path transverse to the transport conveyor and for re-forming the same into a solid row, an elevating mechanism normally residing in a plane below the solid row of articles, said elevating mechanism shiftable upwardly from said normal position and engageable with said solid row of articles during said upward motion, article support means for slidably supporting a row of articles, said elevating mechanism transferring said articles to said support means, said support means adapted to support said solid row of articles in planes one above the other, pusher means movable relative to said article support means, said pusher means adapted to group said row of articles into stack formation, said pusher means adapted to insert the stack endwisely into the tray, and flap closing and sealing means located along the transport conveyor downstream from the loading mechanism for closing and sealing the closure flaps at opposite ends of the tray.

5. A packaging machine for forming trays from flat blanks and for loading and sealing the same, said blank containers formed of relatively stiff sheet material and having overlapping closure flaps at opposite ends, said machine comprising, a transport conveyor having spaced tray carriers, tray forming means mounted relative to the conveyor and adapted to fold a flat blank to the form of a channel-shaped tray and to press the same directly into said carrier, an article loading mechanism located along said conveyor downstream from said tray forming means, said loading mechanism comprising, means for advancing articles toward the transport conveyor along a path transverse to the transport conveyor and for re-forming the same into a solid row, an elevating mechanism normally residing in a plane below the solid row of articles, said elevating mechanism shiftable upwardly from said normal position and engageable with said solid row of articles during said upward motion, article support means adapted to support the row of articles and to segregate the row into groups residing in planes one above another, said elevating mechanism transferring said row of articles to said support means for segregation, pusher means movable relative to said article support means, said pusher means shifting said segregated groups of articles into stack formation and inserting the stack endwisely into the tray, and flap closing and sealing means located along the transport conveyor downstream from the loading mechanism for closing and sealing the closure flaps at opposite ends of the tray.

6. A packaging machine for forming trays from flat blanks and for loading and sealing the same, said blank containers formed of relatively stiff sheet material and having overlapping closure flaps at opposite ends, said machine comprising, a transport conveyor having spaced channel-shaped tray carriers and arranged to advance intermittently, tray forming means mounted relative to the conveyor and adapted to fold a flat blank to the form of a channel-shaped tray and to press the same directly into said channel-shaped carrier during a dwell period thereof, an article loading mechanism located along said conveyor downstream from said tray forming means, said loading mechanism comprising, an infeed conveyor for advancing articles toward the transport conveyor, stop means for arresting the articles and re-forming the same into a solid row on the infeed conveyor, an elevating mechanism normally residing in a plane below said infeed conveyor in a position to engage the solid row of articles thereon, said elevating mechanism shiftable upwardly from said normal position and engageable with said solid row of articles during said upward motion, article support means mounted above said infeed conveyor, said elevating mechanism transferring said articles to said support means, pusher means movable relative to said article support means, said pusher means grouping said row of articles into stack formation and inserting the stack endwisely into the tray during a conveyor dwell period, and flap closing and sealing means located along the transport conveyor downstream from the loading mechanism for closing and sealing the closure flaps at opposite ends of the tray.

7. A packaging machine for loading and sealing channel-shaped trays formed of relatively stiff sheet material and having a main flap and a pair of side flaps at opposite ends, said machine comprising, an intermittent transport conveyor having spaced channel-shaped tray carriers, tray handling means mounted relative to the conveyor and adapted to insert said channel-shaped trays directly into said tray carriers during the conveyor dwell periods, said tray handling means loosely interfitting the interior of said channel-shaped tray carriers, an article loading mechanism located along said conveyor downstream from said tray handling means and adapted to load articles into an open end of the tray in the carrier during a conveyor dwell period, side flap folding means located downstream from said article loading mechanism, said flap folding means folding said side flaps inwardly against opposite ends of the articles loaded into the tray, means residing downstream from the side flap folding means for applying adhesive to the main flaps and for folding the main flaps to a closed position overlying the closed side flaps, and presser means located downstream from the main flap folding means for applying endwise pressure successively to the closed main flaps from opposite ends of the tray during successive conveyor dwell periods for sealing the same.

8. In a packaging machine for forming trays from flat blanks and for loading and sealing the same, said machine having a transport conveyor and having means for folding said blanks to the form of channel-shaped trays and for inserting the same into the transport conveyor, a loading mechanism for loading articles endwisely into said tray, said loading mechanism comprising an infeed conveyor for advancing articles toward the transport conveyor and for re-forming the articles into a solid row on the infeed conveyor adjacent the transport conveyor, a pair of elevator elements straddling the infeed conveyor and normally, residing below the same, actuating means connected to said elements for shifting the same upwardly from said normal position, said elevating elements having article engaging surfaces engaging the solid row of articles during upward motion from said normal position, said article engaging surfaces adapted to locate said articles in groups disposed in planes one above the other, a pair of stationary article support elements residing above said elevator elements and adapted to receive the articles therebetween upon upward motion of the elevator elements, said support elements having spring loaded detent members, engageable with said articles after the elevating elements reach a limit of upward motion and slidably supporting the row of articles in groups disposed in planes one above the other when the elevator elements return to said lowered position, and pusher means movable between said support elements, said pusher means engaging and sliding the articles along said detent members toward and through the end of the tray.

9. In a packaging machine for forming trays from flat blanks and for loading and sealing the same, said machine having an intermittent transport conveyor and having means for folding said blanks to the form of channel-shaped trays and for inserting the same into the transport conveyor, a loading mechanism for loading a stack of articles endwisely into said tray, said loading mechanism comprising an infeed conveyor for advancing articles toward the transport conveyor, stop means mounted in a position to arrest the articles, thereby to re-form the articles into a solid row on the infeed conveyor adjacent the transport conveyor, a pair of elevator elements straddling the infeed conveyor and normally residing below the same, actuating means connected to said elements for shifting the same upwardly from said normal position, said elements having article engaging surfaces engaging the opposite ends of said solid row of articles during upward motion from said normal position and thereby elevating the articles, a pair of stationary article support elements spaced apart from one another and residing above said elevator elements and adapted to receive the elevator elements and the articles thereon, said article support elements having spring loaded detent members adapted to engage said row of articles in several groups residing in planes one above the other after the elevating elements reach a limit of motion upwardly, said detent members slidably supporting said groups after the elevator elements are returned to said lowered position, said detent members supporting the articles substantially in alignment with an endwise portion of the tray during a dwell period of the transport conveyor, and pusher means movable between said article support elements, said pusher means engaging and sliding the groups of articles along said detent members toward the end of the tray, whereby said groups of articles in respective planes are shifted one above the other and are inserted in stack formation through the end of the tray during the conveyor dwell period.

10. In a packaging machine for forming trays from flat blanks and for loading and sealing the same, said machine having an intermittent transport conveyor and having means for folding said blank containers to the form of channel-shaped trays and inserting the same into the transport conveyor, a loading mechanism for loading a stack of articles endwisely into said tray, said loading mechanism comprising an infeed conveyor for advancing articles toward the transport conveyor, stop means mounted in a position to arrest the articles, thereby to re-form the articles into a solid row on the infeed conveyor adjacent the transport conveyor, a pair of elevator plates straddling the infeed conveyor and normally residing below the same, actuating means connected to said plates for shifting the same upwardly from said normal position, said plates having stepped upper edges providing a series of lands residing in horizontal planes one above the other, said lands engaging the opposite ends of said solid row of articles during upward motion from said normal position, said lands thereby segregating the row into groups residing in planes one above the other and elevating the groups, a pair of stationary article support elements spaced apart from one another and residing above said elevating plates and adapted to receive the elevating plates and the articles thereon, said article support elements having spring loaded detent members located in planes one above the other corresponding generally to the planes of said lands and engageable with said groups of articles after the elevating plates reach a limit of motion upwardly, said detent members slidably supporting said groups after the elevator plates are returned to said lowered position, with the groups of articles substantially in alignment with an endwise portion of the tray during the dwell period of the transport conveyor, and pusher means movable between said article support elements, said pusher means engaging and sliding the groups of articles along said detent members toward the end of the tray, whereby said groups of articles in respective planes are shifted one above the other and are inserted in stack formation through the end of the tray during the conveyor dwell period.

11. In a packaging machine for forming trays from flat blanks and for loading and sealing the same, said machine having an intermittent transport conveyor and having means for folding said blanks to the form of channel-shaped trays and for inserting the same into the transport conveyor, a loading mechanism for loading a stack of articles endwisely into said tray, said loading mechanism comprising an infeed conveyor for advancing articles toward the transport conveyor, stop means mounted in a position to arrest the articles, thereby to re-form the articles into a solid row on the infeed conveyor adjacent the transport conveyor, a pair of elevator plates straddling the infeed conveyor and normally residing below the same, actuating means connected to said plates for shifting the same upwardly from said normal position, said plates having stepped upper edges providing a series of lands residing in horizontal planes one above the other, said lands engaging the opposite ends of said solid row of articles during upward motion from said normal position and thereby elevating the articles, a pair of stationary detent plates spaced apart from one another and residing above said elevating plates and adapted to receive the elevating plates and the articles thereon, spring biased detent bars projecting inwardly from said plates toward one another from opposite sides, said bars adapted to spring outwardly upon engagement with the articles during upward motion thereof, whereby said detent bars slidably support the articles when the elevator plates are returned to said lowered position, said detent bars residing in planes one above the other corresponding to said lands and supporting the row of articles in segregated groups residing one above the other substantially in alignment with an endwise portion of the tray during the dwell period of the transport conveyor, and pusher means movable between said detent plates toward the endwise portion of the tray, said pusher means engaging and sliding the groups of articles along said detent elements toward the end of the tray, whereby said groups of articles in respective planes are shifted one above the other and are inserted in stack formation through the end of the tray during the conveyor dwell period.

References Cited in the file of this patent
UNITED STATES PATENTS

| | | |
|---|---|---|
| 2,061,886 | West | Nov. 24, 1936 |
| 2,277,877 | Malhiot | Mar. 31, 1942 |
| 2,390,107 | Kucklinsky | Dec. 4, 1945 |
| 2,430,620 | Sandberg | Nov. 11, 1947 |
| 2,643,497 | Woelfer | June 30, 1953 |
| 2,649,232 | Ferguson et al. | Aug. 18, 1953 |
| 2,744,371 | Hoppe | May 8, 1956 |
| 2,790,287 | Kraft et al. | Apr. 30, 1957 |
| 2,831,586 | Patrick | Apr. 22, 1958 |
| 2,844,927 | Warner | July 29, 1958 |
| 2,845,763 | Wonsidler | Aug. 5, 1958 |
| 2,893,183 | Currie et al. | July 7, 1959 |